US011883348B2

(12) United States Patent
Joles et al.

(10) Patent No.: US 11,883,348 B2
(45) **Date of Patent: *Jan. 30, 2024**

(54) PROGRESSIVE MOBILITY AID DEVICE

(71) Applicant: Mobilate, LLC, Hixson, TN (US)

(72) Inventors: Debbie Joles, Hixson, TN (US); Chad Morgan, Chattanooga, TN (US); Sandeep Kumar, Faber Garden (SG)

(73) Assignee: Mobilate, LLC, Hixson, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/908,597

(22) Filed: Jun. 22, 2020

(65) Prior Publication Data

US 2020/0315902 A1 Oct. 8, 2020

Related U.S. Application Data

(63) Continuation of application No. 16/440,943, filed on Jun. 13, 2019, now Pat. No. 10,688,013.

(Continued)

(51) Int. Cl.
*A61H 3/04* (2006.01)
*A61H 3/00* (2006.01)

(52) U.S. Cl.
CPC ......... *A61H 3/04* (2013.01); *A61H 2003/001* (2013.01); *A61H 2003/002* (2013.01);
(Continued)

(58) Field of Classification Search
CPC ........ A61H 2003/001; A61H 2003/002; A61H 3/04
See application file for complete search history.

(56) References Cited

U.S. PATENT DOCUMENTS

| | | | | |
|---|---|---|---|---|
| 950,545 A * | 3/1910 | Taubert | B60B 33/06 16/32 |
| 1,731,640 A * | 10/1929 | Thurlby | B60B 33/06 16/34 |

(Continued)

FOREIGN PATENT DOCUMENTS

| | | | |
|---|---|---|---|
| DE | 603969 C * | 10/1934 | B60B 33/06 |
| DE | 202020004337 U1 * | 2/2021 | B60B 33/066 |
| GB | 404655 A * | 1/1934 | B60B 33/06 |

*Primary Examiner* — David R Dunn
*Assistant Examiner* — Danielle Jackson
(74) *Attorney, Agent, or Firm* — Benesch, Friedlander, Coplan & Aronoff, LLP

(57) ABSTRACT

Disclosed herein are novel embodiments of progressive mobility aid devices. Such progressive mobility aid devices are designed to progress through a variety of configurations to accommodate the use of the progressive mobility aid device in a safe and secure manner as the user of the progressive mobility aid device traverses a variety of surfaces and terrain such as traversing irregular surfaces including sidewalks and stone-based surfaces; loose surfaces and terrain including gravel and sand; soft surfaces including wet ground and carpeted surfaces; and variable gradient surfaces including stairs and inclining or declining surfaces and terrain. The progressive mobility aid devices accommodate such uses with an articulating design that provides for front legs of the progressive mobility aid device to be pivotably adjusted with respect to the rear legs of the progressive mobility aid device, and with wheel assemblies that are selectively deployable and retractable.

14 Claims, 30 Drawing Sheets

Related U.S. Application Data

(60) Provisional application No. 62/684,469, filed on Jun. 13, 2018.

(52) U.S. Cl.
CPC ................ *A61H 2201/0192* (2013.01); *A61H 2201/1445* (2013.01)

(56) References Cited

U.S. PATENT DOCUMENTS

| | | | | | |
|---|---|---|---|---|---|
| 1,999,106 | A * | 4/1935 | Muller | B60B 33/06 | 16/34 |
| 2,712,366 | A * | 7/1955 | Skupas | B60B 33/0089 | 188/5 |
| 4,621,804 | A * | 11/1986 | Mueller | A47D 13/043 | 135/67 |
| 5,263,506 | A * | 11/1993 | Narramore | A61H 3/00 | 135/67 |
| 5,649,558 | A * | 7/1997 | Richard | A61H 3/00 | 135/67 |
| 5,740,825 | A * | 4/1998 | Brunengo | A61H 3/00 | 135/67 |
| 5,787,913 | A * | 8/1998 | Li | A61H 3/00 | 135/67 |
| 8,480,100 | B2 * | 7/2013 | Staggs | A61G 5/1002 | 280/87.021 |
| 8,820,338 | B1 * | 9/2014 | Catricala | A61H 3/00 | 135/75 |
| 9,119,757 | B2 * | 9/2015 | Triolo | A61H 3/00 | |
| 9,358,175 | B2 * | 6/2016 | Bordan | A61H 3/00 | |
| 9,545,354 | B1 * | 1/2017 | Klausmeyer | A61H 3/00 | |
| 9,839,570 | B2 * | 12/2017 | O'Sullivan | A61H 3/04 | |
| 10,688,013 | B2 * | 6/2020 | Joles | A61H 3/04 | |
| 2012/0298160 | A1 * | 11/2012 | Hamilton | A61H 3/00 | 135/66 |
| 2015/0001359 | A1 * | 1/2015 | Catchings | F16M 11/041 | 248/220.22 |
| 2016/0253890 | A1 * | 9/2016 | Rabinowitz | G09B 19/24 | 340/539.13 |
| 2017/0175997 | A1 * | 6/2017 | Rosenblum | A61H 3/04 | |
| 2018/0021200 | A1 * | 1/2018 | Orndorff | A61H 3/00 | 135/67 |
| 2022/0031553 | A1 * | 2/2022 | Wang | A61H 3/04 | |

* cited by examiner

PROGRESSIVE MOBILITY AID DEVICE

CROSS-REFERENCE TO RELATED APPLICATIONS

This application claims priority to pending U.S. patent application Ser. No. 16/440,943, titled "Progressive Mobility Aid Device," and filed on Jun. 13, 2019, which claims priority to U.S. Provisional Patent Application Ser. No. 62/684,469, titled "Adjustable Walker," filed on Jun. 13, 2018, which is expressly incorporated by reference herein in its entirety.

FIELD OF INVENTION

The present disclosure generally relates to ambulatory assisting devices that can progress through a variety of configurations to aid the mobility of a user of the device. More specifically, the present disclosure relates to ambulatory assisting devices that progress through a variety of configurations to accommodate the use of the device in a safe and secure manner as the user of the device traverses a variety of surfaces and terrain such as traversing irregular surfaces such as sidewalks and stone-based surfaces; "loose" surfaces and terrain such as gravel and sand; "soft" surfaces such as wet ground and carpeted surfaces; and variable gradient surfaces such as stairs and inclining or declining surfaces and terrain.

BACKGROUND

Due to increases in life expectancy, the general population is aging and individuals are living longer, resulting in a rise in certain medical conditions that hinder or inhibit peoples' natural ambulatory abilities. Statistics show that approximately 100 million Americans suffer from a chronic condition that may limit their independence and mobility. The number of seniors experiencing at least one challenge or difficulty with a basic activity or limitations with complex activities is an alarming 60%. Thus, many seniors and others experiencing difficulty with mobility are left with limited ability to move from one location to another. Even as people age or are subject to physical limitations, there is a natural desire to remain mobile, that is, to be able to walk or otherwise move from one location to another without the assistance of another person. In addition to the freedom that comes with ease of movement, there are also health advantages to staying mobile as opposed to leading an increasingly sedentary life, which greatly contributes to the functional decline of the body.

A common class of ambulatory aid device, which allows a user continued mobility, is a "walker." Walkers, or walking frames, typically assist the elderly or otherwise physically affected people in traversing short to medium distances while maintaining their balance and stability. Walkers are typically constructed of relatively lightweight aluminum frames that provide a solid base to stabilize a user, but are light enough for the user to lift and move forward and backwards so that the user can brace himself or herself when moving from one location to another. Walkers typically include four extending legs, cross members for connecting and stabilizing the legs, and grips and/or handles that allow the user to effectively hold and move the walker during use. Walkers can be equipped with wheels that further facilitate mobility of the user of the walker.

The length of the legs of traditional walkers may be generally adjustable using a typical telescoping arrangement with detents in one telescoping member and a series of corresponding apertures in an associated telescoping member. However, such general adjustments are not dynamic in that it takes time and effort to correctly and independently adjust each leg. Thus, such adjustments are commonly done only occasionally to accommodate the height of the current user of the walker. It is impractical to adjust the height of the legs for each use of traditional walkers or specifically for a section of a path traveled by the user. As will be appreciated, when the legs of the walker are statically set to be of equal length, it is difficult for the walker to assist a user is traversing anything more than a level and even surface. Thus, while a walker does provide its users with the desired mobility and freedom of movement while traversing level surfaces, there are substantial limitations to such walkers when the user encounters anything other than even surfaces, such as irregular surfaces such as sidewalks and stone-based surfaces and variable gradient surfaces such as stairs and inclining or declining surfaces and terrain. Furthermore, for walkers equipped with wheels, the user may encounter a surface or terrain that is generally incompatible with a wheeled walker such as gravel, sand, and wet ground, which inhibits the efficacy of the walker.

In fact, traditional walkers can be dangerous to users that struggle with strength and balance. Studies have shown that the elderly that rely on walkers remain prone to falls that often result in injuries. Each year, tens of thousands of patients are treated for injuries related to falls while using a walker. Many of these falls occur when the user encounters variable gradient surfaces such as stairs and inclining or declining surfaces. In fact, the inability to traverse a set of stairs in a patient's home remain the number one reason that prevents mobility-challenged patients from being released from healthcare facilities. A set of stairs, even a single set of two or three steps, in the home, can cause a person to lose the ability to live independently in his or her home because stairs are too difficult and dangerous to navigate.

As will be appreciated, while traditional walkers are stable and usable on flat and/or even surfaces, such walkers are typically ineffective and dangerous when used to traverse any more challenging terrain, including stairs and any moderate to severe inclining or declining surfaces or terrain.

There is a need for a novel progressive mobility aid device that can dynamically adjust to accommodate challenging surfaces and terrain such as irregular surfaces (e.g., sidewalks and stone-based surfaces), loose surfaces and terrain (e.g., gravel and sand); soft surfaces (e.g., wet ground and carpeted surfaces), and variable gradient surfaces (e.g., stairs and inclining or declining surfaces and terrain). This is to say that there is a need for a progressive mobility aid device that includes the functionality to dynamically adjust the progressive mobility aid device to a variety of surfaces and terrain. Such functionality includes the ability to adjust relative elevation of the front legs relative to the rear legs of the progressive mobility aid device such that the legs can be set at relative heights that provides for a stable base for the user even when traversing a set of stairs or moderate or severely inclining or declining surfaces and the ability to engage and disengage wheels depending on the surface and terrain encountered by a user. Disclosed herein is such a novel progressive mobility aid device.

SUMMARY

Disclosed herein are novel embodiments of progressive mobility aid devices. In one embodiment, a progressive mobile aid device includes a front-left leg assembly, a front-right leg assembly, and a rear-left leg assembly, a rear-right leg assembly. The progressive mobile aid device further includes a lower left sidebar including a first end and a second end, where the lower left sidebar is pivotably coupled to the front-left leg assembly proximate to the first end and pivotably coupled to the rear-left leg assembly proximate to the second end; a lower right sidebar including a first end and a second end, where the lower right sidebar is pivotably coupled to the front-right leg assembly proximate to the first end and pivotably coupled to the rear-right leg assembly proximate to the second end; an upper left sidebar including a first end and a second end, where the upper left sidebar is pivotably coupled to the front-left leg assembly proximate to the first end and pivotably coupled to the rear-left leg assembly proximate to the second end; and an upper right sidebar including a first end and a second end, where the upper right sidebar is pivotably coupled to the front-right leg assembly proximate to the first end and pivotably coupled to the rear-right leg assembly proximate to the second end.

BRIEF DESCRIPTION OF THE DRAWINGS

In the accompanying drawings, structures are illustrated that, together with the detailed description provided below, describe example embodiments of the disclosed systems, methods, and apparatus. Where appropriate, like elements are identified with the same or similar reference numerals. Elements shown as a single component can be replaced with multiple components. Elements shown as multiple components can be replaced with a single component. The drawings may not be to scale. The proportion of certain elements may be exaggerated for the purpose of illustration.

DETAILED DESCRIPTION

Figure 1:
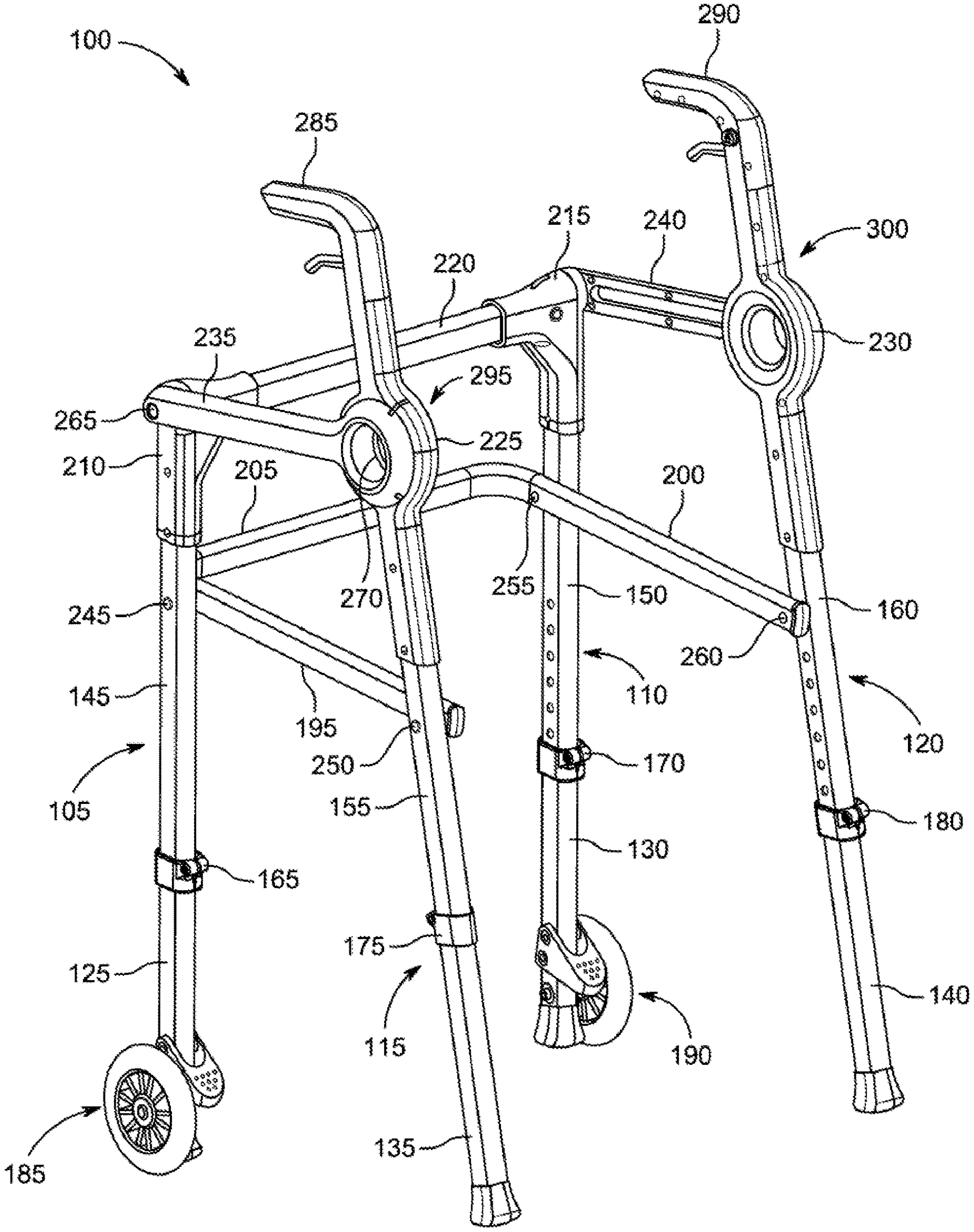
FIG. 1 schematically illustrates a rear perspective view of a progressive mobility aid device.

The apparatus, systems, arrangements, and methods disclosed in this document are described in detail by way of examples and with reference to the figures. It will be appreciated that modifications to be disclosed and described examples, arrangements, configurations, components, elements, apparatus, methods, materials, etc. can be made and may be desired for a specific application. In this disclosure, any identification of specific techniques, arrangements, method, etc. are either related to a specific example presented or are merely a general description of such a technique, arrangement, method, etc. Identifications of specific details or examples are not intended to be and should not be construed as mandatory or limiting unless specifically designated as such. Selected examples of apparatus, arrangements, and methods for using a progressive mobility aid device are hereinafter disclosed and described in detail with reference made to FIGS. 1-26.

Disclosed herein is a novel progressive mobility aid device to assist users in moving from one location to another. The progressive mobility aid device includes a frame with a front pair of legs and rear pair of legs, where the front pair of legs and rear pair of legs are pivotably attached such that the user can manually adjust the elevation of the front legs relative to the rear legs. Such adjustment can be made through the use of a pair of clutch mechanisms that control the pivotal movement of the front legs relative to the rear legs. Such clutch mechanisms can be designed so that the incremental pivotal movement of the front legs relative to the rear legs is relatively small, resulting in a progressive mobility aid device where the positioning of the front legs relative to the rear legs is relatively precise. As further disclosed herein, the novel progressive mobility aid device includes as number of wheels to further assist users in moving from one location to another. The wheels are retractable, that is to say that the wheels can be selectively moved from a deployed position, where the wheel engages the surface traversed by the user, and a retracted position, where the wheel is elevated above the surface traversed by the user as to not engage the surface.

As will be understood with subsequent description with references to the figures, the progressive mobility aid device disclosed herein is designed such that the progressive mobility aid device can be configured and/or arranged in many different configurations to accommodate any number of diverse and challenging surfaces and terrain traversed by the user. For example, when a user is traversing an inclining surface, such as walking up a set of stairs or walking up an inclining pathway, the user can manually adjust the front legs to be secured at an elevation where the front legs are positioned above the rear legs. In such an arrangement, the rear legs can rest on the lower step of the stairs (or lower section of the pathway) and the front legs can rest on the higher step (or higher section of pathway). Although the front legs and rear legs are at two different elevations, at least a portion of the top section of the frame of the progressive mobility aid device, which provides a stable structure for the user to manually engage, remains level and provides the user the stability required to safely traverse the stairs of inclined pathway. Conversely, when a user is traversing a declining surface, such as walking down a set of stairs or walking down a declining pathway, the user can manually adjust the front legs to be secured at an elevation below the rear legs such that the front legs can rest on the lower step of the stairs (or lower section of pathway) and the rear legs can rest on the higher step (or higher section of pathway). Similarly as previously described, in such an arrangement, although the front legs and rear legs are at two different elevations, at least a portion of the top section of the frame remains level. As will be understood, in both examples described, when ascending or descending stairs or an inclining or declining pathway, the user of the progressive mobility aid device can support himself or herself on the level top portion of the frame while safely traversing the variable gradient surface. In both instances, the user remains at a generally constant orientation, i.e., generally perpendicular to surface supporting the user; and, thus, the user can safely and confidently ascend stairs or inclining pathways and descend stairs or declining pathways without fear of losing his or her balance and avoiding unnecessary falls and injuries.

It will be understood that one of the benefits of the progressive mobility aid device is that with a portion of the top section of the frame remaining level when configured for traversing inclining and declining surfaces, the user can maintain a perpendicular positioning with regard to that section of the frame. Such a positioning of the user maintains continuity across multiple configurations of the progressive mobility aid device, which provides the user a feeling of consistency in using the progressive mobility aid device regardless of the particular surface traversed by the user.

In another example, when the user is traversing along a level and smooth surface, such as a paved pathway, the user may prefer to use the wheels of the progressive mobility aid device to assist in moving the progressive mobility aid device along the level and smooth pathway. The progressive mobility aid device includes mechanisms to quickly and efficiently deploy the wheels for use on the traversed surface. Conversely, when the user is traversing along an uneven or loose surface, such as an irregular sidewalk, gravel, or sand, the user may prefer to refrain from using the wheels of the progressive mobility aid device because the use of the wheel on such surfaces can inhibit the user from successfully traversing the irregular or loose surface. The progressive mobility aid device includes mechanisms to quickly and efficiently retract the wheels so that the wheels are not engaged with the traversed surface.

It will be understood that throughout this disclosure, where reference is made to traversing inclining surfaces or declining surfaces, such disclosure can be equally applicable to traversing up or down a set of stairs and vice versa. Additionally, while references herein are made to the "left side" or "right side" of a progressive mobility aid device for convenience of description, it will be understood that many components and assemblies of the progressive mobility aid device disclosed herein have equivalent components on the left and right of the progressive mobility aid device that server equivalent functions. Thus, disclosure directed to a "left side" component, for example, may be equally applicable to an equivalent "right side" component.

The novel progressive mobility aid device is described as "progressive" because the progressive mobility aid device can progress from one configuration to another with simple and straightforward actions by the user. For example, as will be fully described herein, the user can change the relative position of the front legs relative to the rear legs by manipulating a pair of levers and/or buttons. Similarly, the user can deploy and/or retract the wheels of the progressive mobility aid device by simply manipulating pedals and/or buttons. Furthermore, the terms "articulating" and "adjustable" can be used to describe the progressive mobility aid device. Generally, the adjustability of the progressive mobility aid device is facilitated by a number of pivot points that pivotally connect various components of the progressive mobility aid device. The number and arrangement of such pivot points allow for the progressive mobility aid device to be arranged in any number of configurations to accommodate any number of uneven or variable gradient surfaces (along with level surfaces). For example, a progressive mobility aid device can be configured such that the front legs and rear legs can be adjusted to accommodate uneven or variable gradient pathways that have a mild inclining or declining grade, a substantial inclining and declining grade, and all grades in between. Similarly, a progressive mobility aid device can be configured such that the front legs and rear legs can be adjusted to accommodate sets of stairs that have a small vertical increments between steps, large vertical increments between steps, and all vertical increments in between.

Figure 2:
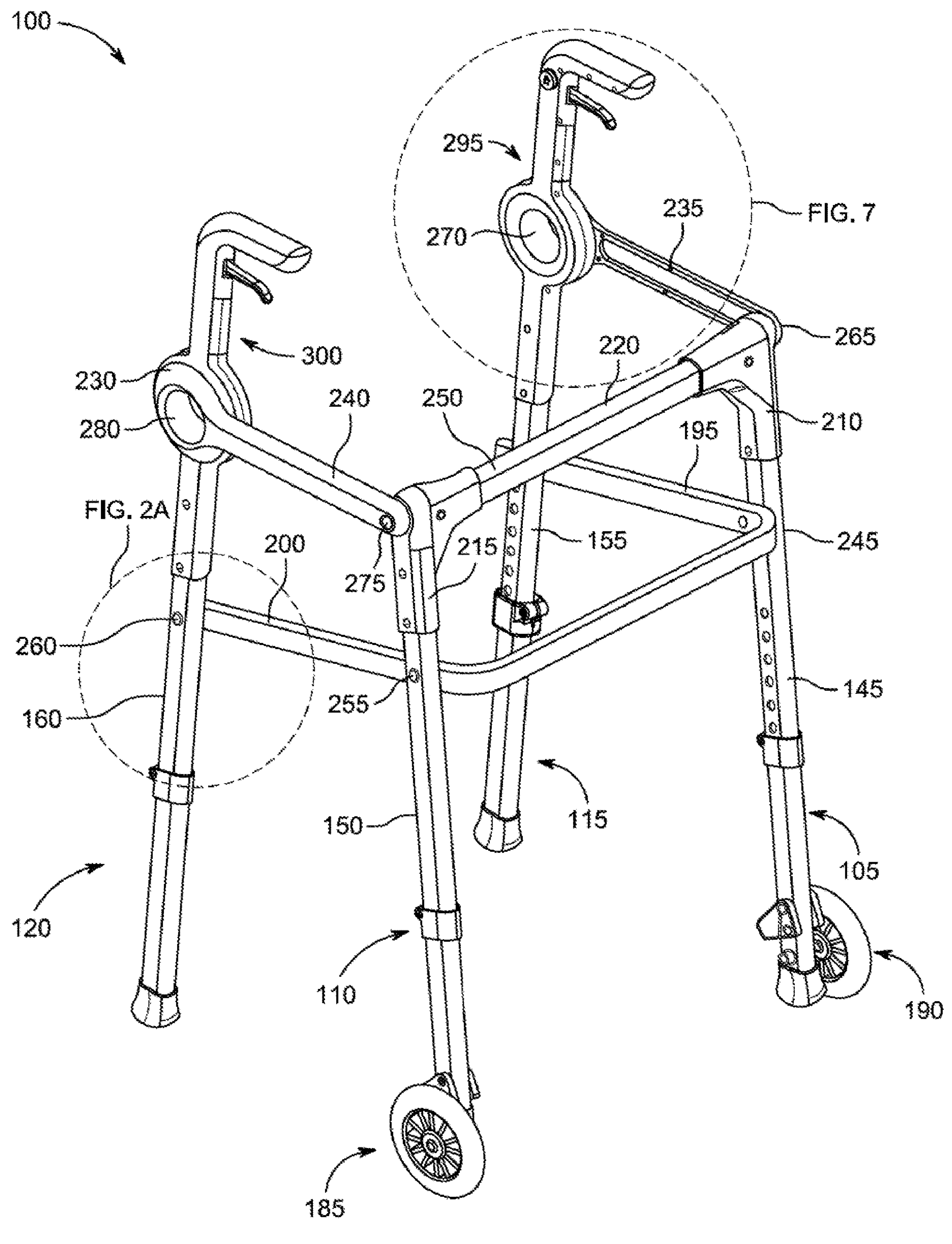
FIG. 2 schematically illustrates a front perspective view of the progressive mobility aid device of FIG. 1.
Figure 2A:
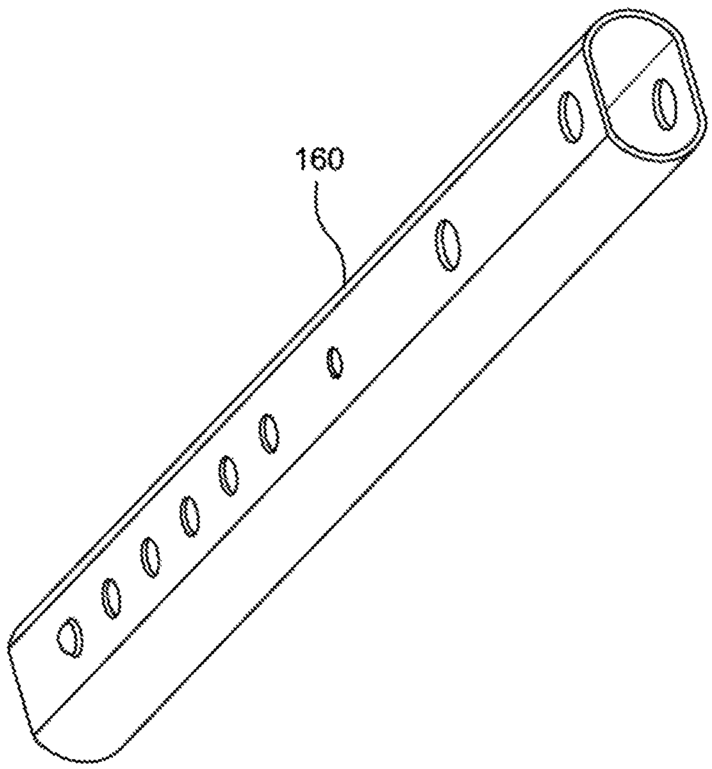
FIG. 2A schematically illustrates a perspective view of a rear-right upper tubular member for use with the progressive mobility aid device of FIG. 1.

A progressive mobility aid device 100 will be further described with reference to the figures. FIGS. 1 and 2 schematically illustrate a rear-left perspective view and a front-right perspective view, respectively, of the progressive mobility aid device 100. The progressive mobility aid device 100 includes (from the perspective of the user) a front-left leg assembly 105, a front-right leg assembly 110, a rear-left leg assembly 115, and a rear-right leg assembly 120. Each leg assembly (105, 110, 115, and 120) includes a corresponding lower tubular member (125, 130, 135, and 140) and a corresponding upper tubular member (145, 150, 155, and 160). Each lower tubular member (125, 130, 135, and 140) is slideably inserted into its corresponding upper tubular member (145, 150, 155, and 160) and can be arranged to vary the length of each leg. As will be understood, in practice, the length of each leg assembly (105, 110, 115, and 120) is statically set to approximately the same length to ensure that the progressive mobility aid device 100 remains stable and can be safely operated by the user. As illustrated in FIG. 2A, in one embodiment, the lower tubular member (125, 130, 135, and 140) and upper tubular member (145, 150, 155, and 160) can be generally oblong in cross-section. While the tubular members (125, 130, 135, 140, 145, 150, 155, and 160) can have other cross-sections, such as circular, square, rectangular, and the like, a generally oblong cross-section can be resistant to substantial damage from sharp side impacts.

Each leg assembly (105, 110, 115, and 120) includes a collar (165, 170, 175, and 180) that can secure the position of the lower tubular member (125, 130, 135, and 140) relative to its corresponding upper tubular member (145, 150, 155, and 160). It will be understood that arranging the leg assemblies (105, 110, 115, and 120) at varying lengths is generally a one-time operation to adjust the progressive mobility aid device 100 to the height of the user and is not generally used to facilitate the user traversing uneven or variable gradient terrain using the progressive mobility aid device 100.

As illustrated in FIGS. 1 and 2, the front-left leg assembly 105 and the front-right leg assembly 110 are generally positioned vertically and parallel to each other. The rear-left leg assembly 115 and the rear-right leg assembly 120 are generally positioned parallel to each other and on an angle to the other components of the progressive mobility aid device 100, where the distal end of the lower rear-left tubular member 135 and the distal end of the lower rear-right tubular member 140 are located to the rear of the top portions of the rear-left upper tubular member 155 and the rear-right upper tubular member 160. In one example, the rear leg assemblies (115 and 120) are positioned at an approximately four degrees as compared to the vertical front leg assemblies (105 and 110).

The progressive mobility aid device 100 further includes a left wheel assembly 185 secured proximate to a distal end of the front-left lower tubular member 125 and a right wheel assembly 190 secured proximate to a distal end of the front-right lower tubular member 130. The left wheel assembly 185 and the right wheel assembly 190 are arranged to toggle between a deployed position, where the wheel assemblies (185 and 190) engage the traversed surface to facilitate the movement of the user (such as on a smooth, paved pathway) and a retracted position, where the wheel assemblies (185 and 190) do not engage the traversed surface to facilitate safe movement of the user (such as on stairs, declining surfaces, or challenging terrain such as sand, gravel, or muddy ground). The left wheel 185 and the right wheel 190 assemblies 190 will be subsequently described herein in greater detail. As also will be subsequently described, the progressive mobility aid device 100 can also include four wheel assemblies.

Figure 3B:
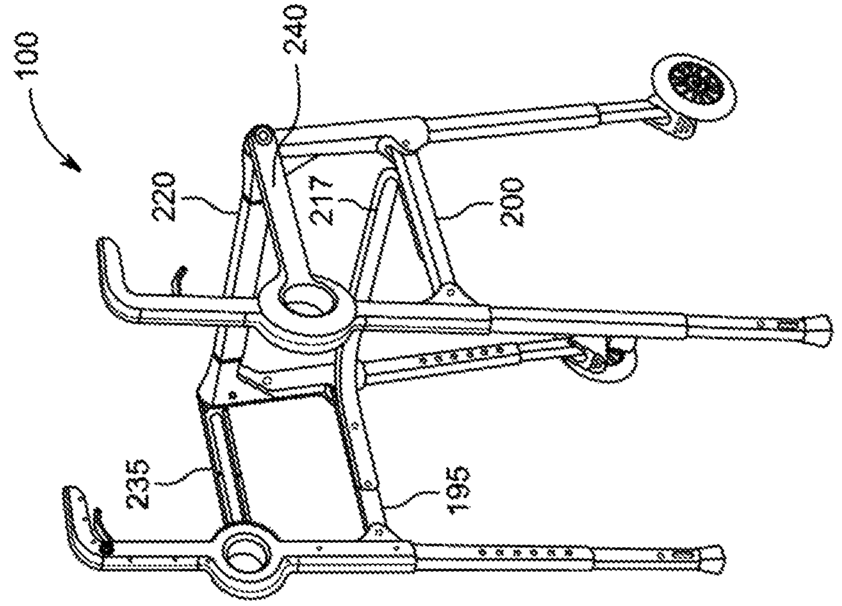
FIG. 3B schematically illustrates a right-rear perspective view of an alternative arrangement for a crossbar for the progressive mobility aid device of FIG. 1.
Figure 3A:
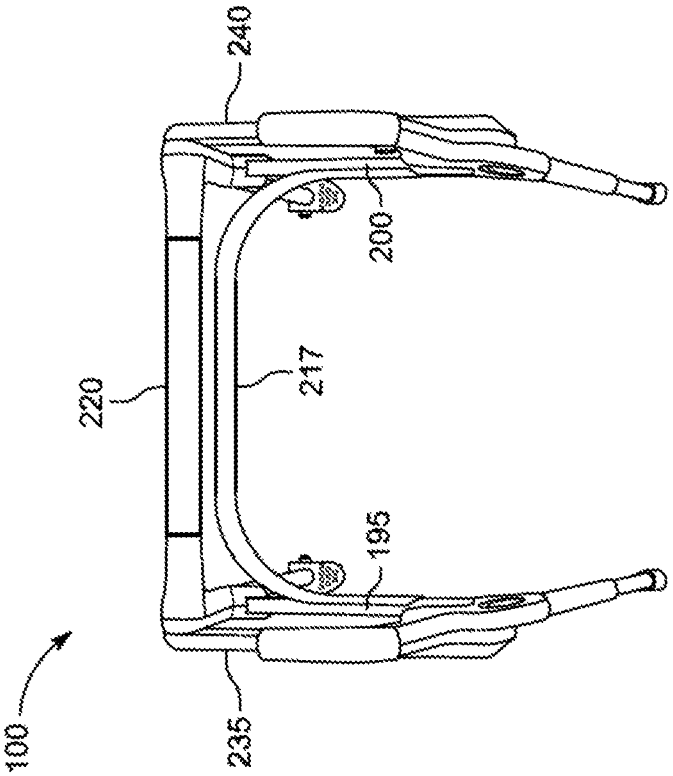
FIG. 3A schematically illustrates a top view of an alternative arrangement for a crossbar for the progressive mobility aid device of FIG. 1.

The progressive mobility aid device 100 further includes a lower left sidebar 195 linking the front-left leg assembly 105 and the rear-left leg assembly 115, a lower right sidebar 200 linking the front-right leg assembly 110 and the rear-right leg assembly 120; and a lower crossbar 205 linking the lower left sidebar 195 and the lower right sidebar 200. As will be understood, the lower crossbar 205 effectively links the front-left leg assembly 105 to the front-right leg assembly 110. In another embodiment, the lower left sidebar 195, lower right sidebar 200, and lower crossbar 205 are integrally connected to form a u-shaped structure that serves the same linking functions as described herein. In yet another embodiment, as illustrated in FIGS. 3A and 3B, in addition to a lower left sidebar 195 and lower right sidebar 200, the progressive mobility aid device 100 includes a u-shaped crossbar 217 in place of the lower crossbar 205. The u-shaped crossbar 217 is secured to the lower left sidebar 195 and lower right sidebar 200 and adds rigidity to the progressive mobility aid device 100. As will be understood, any of the embodiments illustrated or disclosed herein provide for a stable and safe configuration for a user of the progressive mobility aid device 100.

The progressive mobility aid device 100 includes a front-left housing 210, a front-right housing 215 and an upper crossbar 220. The front-left housing 210 connects the front-left upper tubular member 145 and the upper crossbar 220, and the front-right housing 215 connects the front-right upper tubular member 150 and the upper crossbar 220. As with the lower crossbar 205, the upper crossbar 220 effectively links the front-left leg assembly 105 and the front-right leg assembly 110 so that the front-left leg assembly 105 and the front-right leg assembly 110 generally move in cooperation with each other. Similarly, the progressive mobility aid device 100 includes a rear-left housing 225, a rear-right housing 230, an upper left sidebar 235, and an upper right sidebar 240. The rear-left housing 225 connects the rear-left upper tubular member 155 and the upper left sidebar 235, and the rear-right housing 230 connects the rear-right upper tubular member 160 and the right sidebar 240. The upper left sidebar 235 is connected to the front-left housing 210, and the upper right sidebar 240 is connected to the front-right housing 215. As with the lower sidebars (195 and 200), the upper left sidebar 235 effectively links the front-left leg assembly 105 and the rear-left leg assembly 115, and the upper right sidebar 240 effectively links the front-right leg assembly 110 and the rear-right leg assembly 120.

As will be appreciated, the leg assemblies (105, 110, 115, and 120), housings (210, 215, 225, and 230), sidebars (195, 200, 235, and 240), and crossbars (205 and 220) directly or indirectly connect and interact to form a frame for the progressive mobility aid device 100. Each such component is made from a structural material, such as metal, a structural polymer, a carbon composite, fiberglass, or the like, and the positioning of the sidebars (195, 200, 235, and 240) and crossbars (205 and 220) are positioned to bear and distribute force in a way that facilitates a frame that is safe and stable and can generally support the weight and force applied by nearly any potential user.

The linking functionality of the sidebars (195, 200, 235, and 240) and crossbars (205 and 220) is such that the front leg assemblies (105 and 110) can move relative to the rear leg assemblies (115 and 120) to vary the elevation of the front leg assemblies (105 and 110) relative to the rear leg assemblies (115 and 120). Such relative movement is accomplished by forming pivoting engagements where the sidebars (195, 200, 235, and 240) engage the leg assemblies (105, 110, 115, and 120) or housings (210, 215, 225, and 230). Specifically, (as illustrated in FIGS. 1 and 2) where the lower left sidebar 195 engages the front-left upper tubular member 145, a first pivot point 245 is formed. Where the lower left sidebar 195 engages the rear-left upper tubular member 155, a second pivot point 250 is formed. On the opposite side of the progressive mobility aid device 100, where the lower right sidebar 200 engages the front-right upper tubular member 150, a third pivot point 255 is formed, and where the lower right sidebar 200 engages the rear-right upper tubular member 160, a fourth pivot point 260 is formed. Similarly, where the upper left sidebar 235 engages the front-left housing 210, a fifth pivot point 265 is formed, where the upper left sidebar 235 engages the rear-left housing 225, a sixth pivot point 270 is formed, where the upper right sidebar 240 engages the front-right housing 215, a seventh pivot point 275 is formed, and where the upper right sidebar 240 engages the rear-right housing 230, an eighth pivot point 280 is formed.

Figure 4:
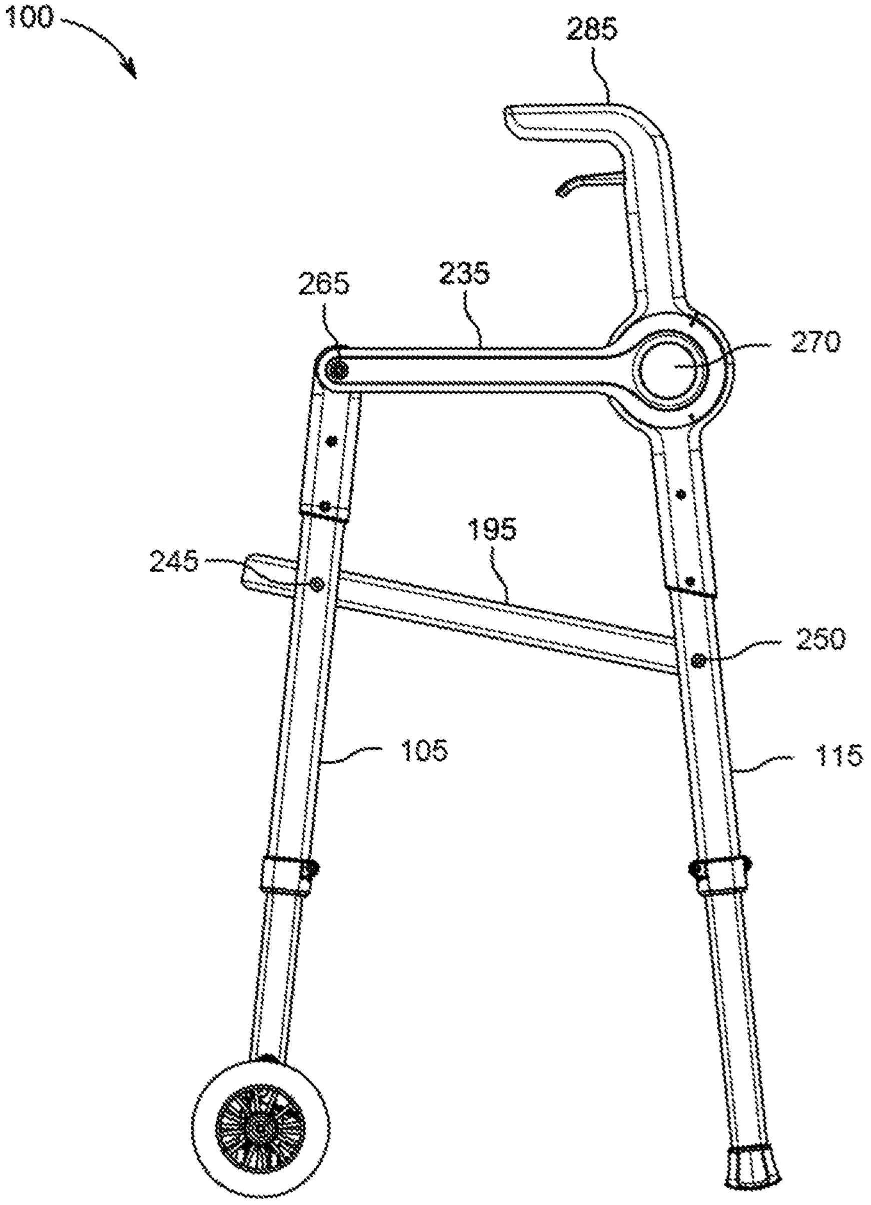
FIG. 4 schematically illustrates a side view of the progressive mobility aid device of FIG. 1.
Figure 5A:
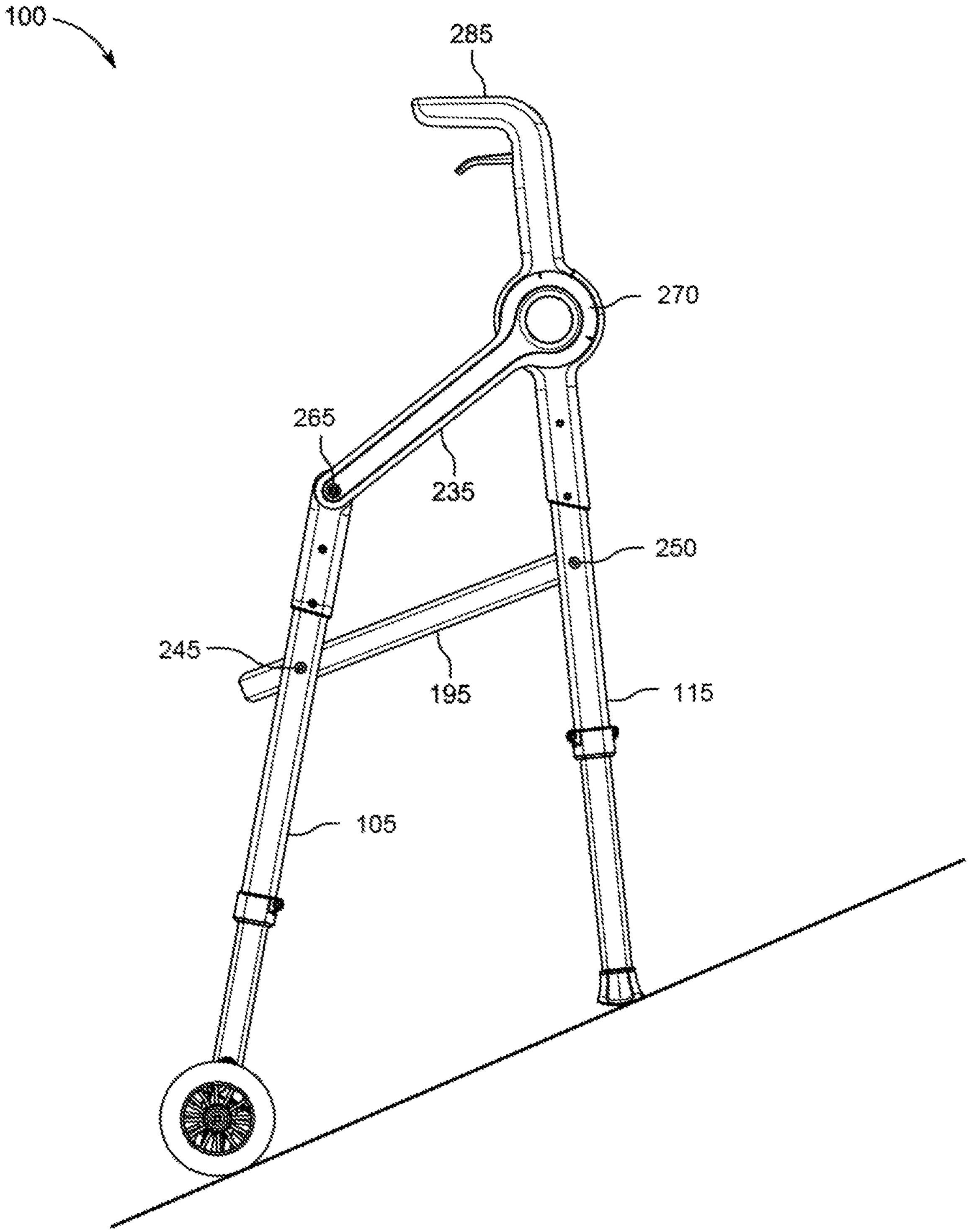
FIG. 5A schematically illustrates a side view of the progressive mobility aid device of FIG. 1 arranged to assist a user in traversing an inclined surface.
Figure 5B:
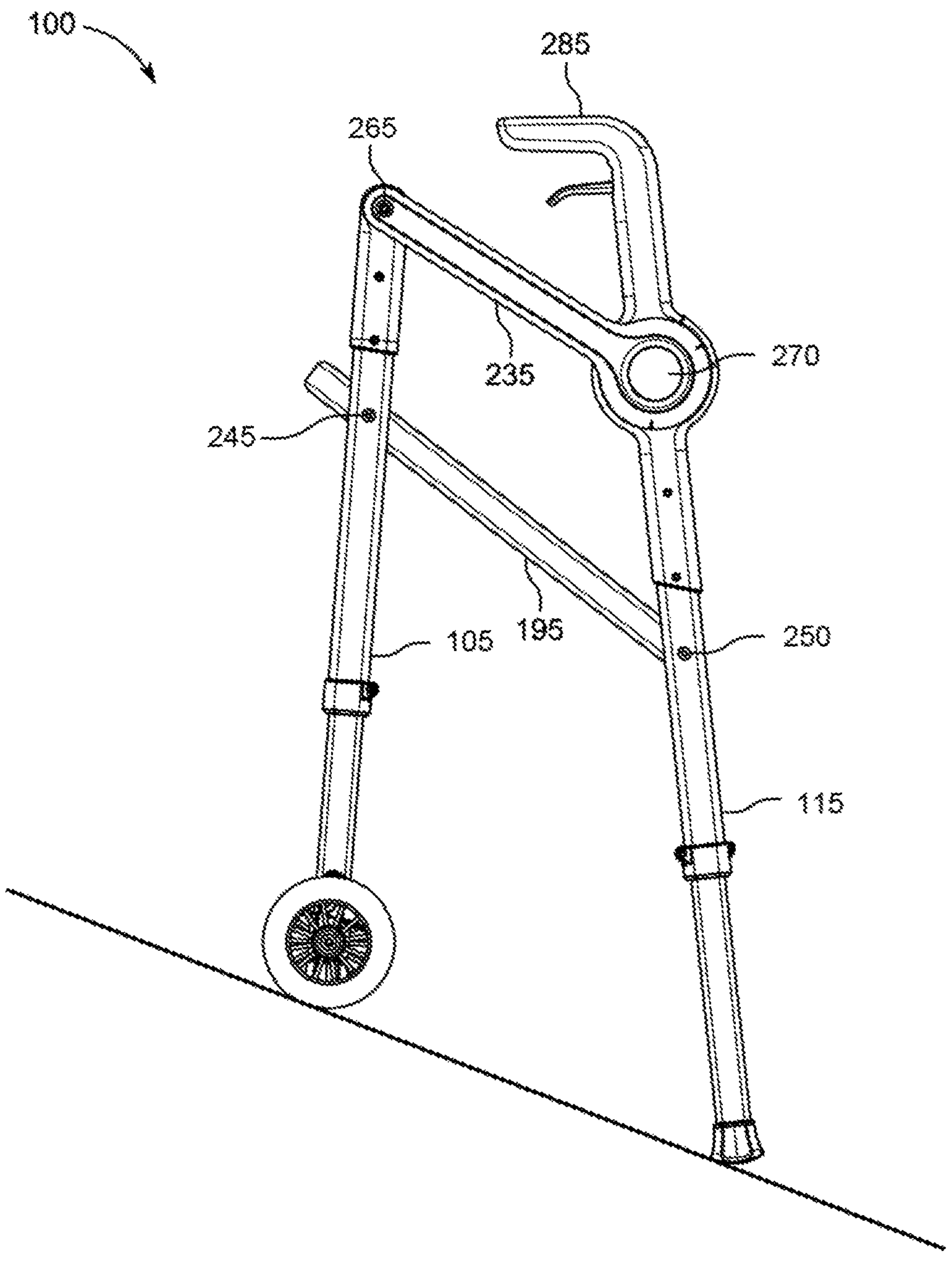
FIG. 5B schematically illustrates a side view of the progressive mobility aid device of FIG. 1 arranged to assist a user in traversing a declining surface.
Figure 6A:
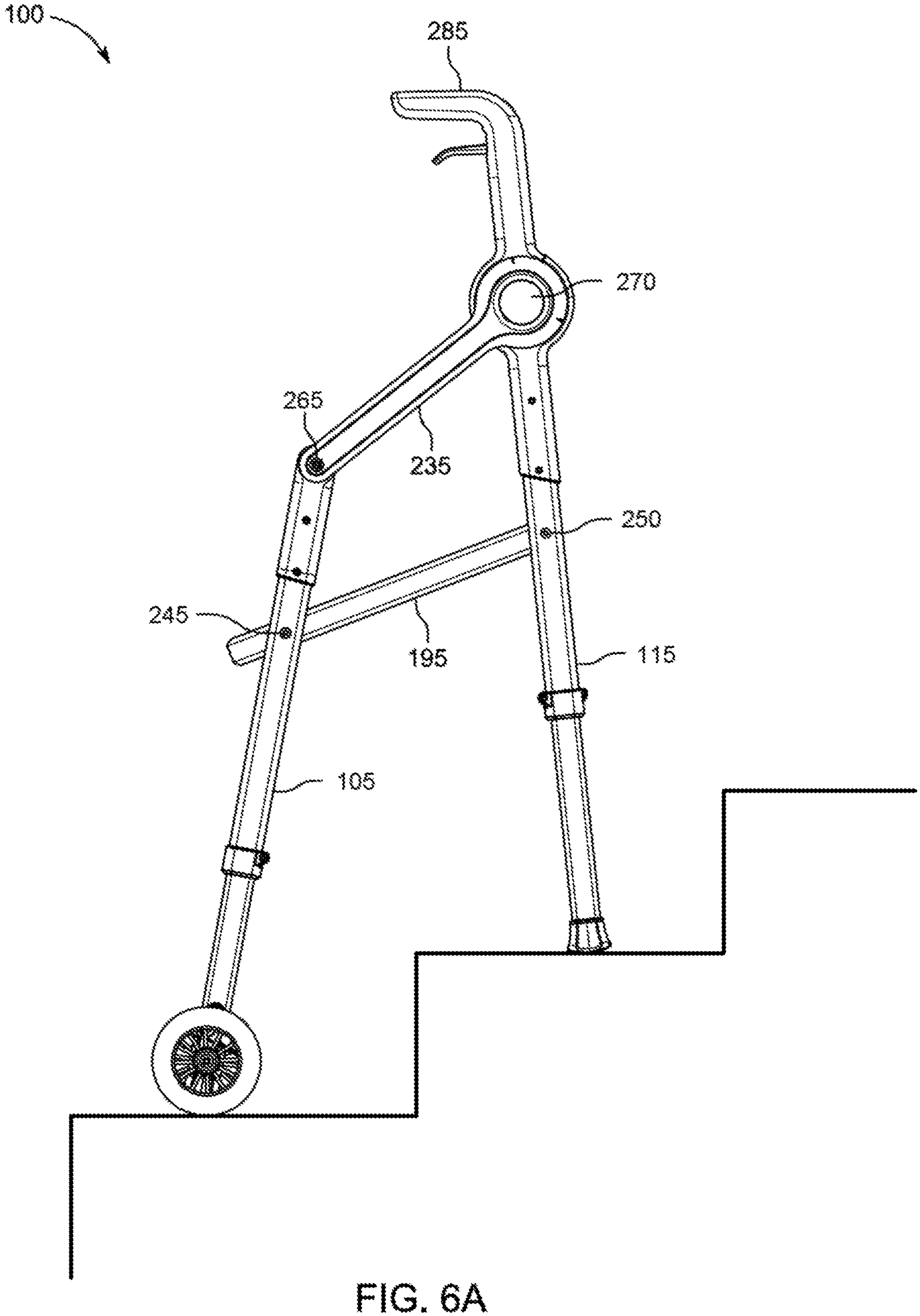
FIG. 6A schematically illustrates a side view of the progressive mobility aid device of FIG. 1 arranged to assist a user in traversing up a set of stairs.
Figure 6B:
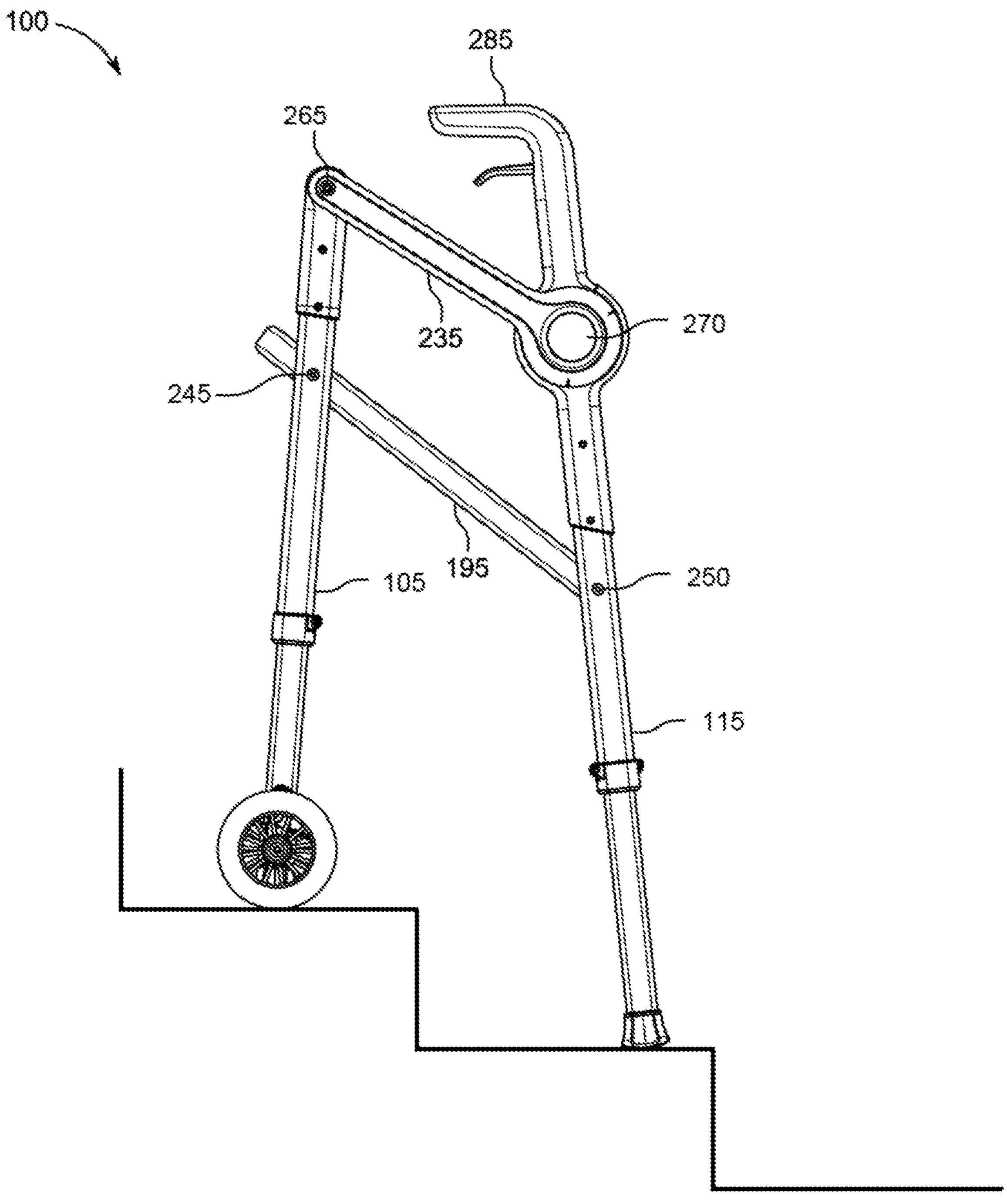
FIG. 6B schematically illustrates a side view of the progressive mobility aid device of FIG. 1 arranged to assist a user in traversing down a set of stair.

As illustrated in FIGS. 4, 5A, 5B, 6A, and 6B, the pivot points allow for the progressive mobility aid device 100 to be configured in a first arrangement to assist a user in traversing a declining surfaces (illustrated in FIGS. 5A and 6A) or configured in a second arrangement to assist a user in traversing inclining surfaces (illustrated in FIGS. 5B and 6B). As will be further described herein, the progressive mobility aid device 100 can be releasably secured or locked in the arrangements illustrated in FIGS. 4, 5A, 5B, 6A, and 6B. As illustrated in FIG. 4, when traversing an even surface, the progressive mobility aid device 100 is arranged so that the front leg assemblies (105 and 110) and the rear leg assemblies (115 and 120) are generally at the same elevation. In order to traverse an inclining pathway, the front leg assemblies (105 and 110) are raised to an elevation above the rear leg assemblies (115 and 120), as illustrated in FIG. 5B. When the front leg assemblies (105 and 110) are raised to an elevation above the rear leg assemblies (115 and 120), the lower left sidebar 195 rotates in a clockwise direction (relative to FIG. 5A) about the first 245 and second 250 pivot points to accommodate such movement, the lower right sidebar 200 rotates in a clockwise direction about the third 255 and fourth 260 pivot points to accommodate such movement, the upper left sidebar 235 rotates in a clockwise direction about the fifth 265 and sixth 270 pivot points to accommodate such movement, and the upper right sidebar 240 rotates in a clockwise direction about the seventh 275 and eighth 280 pivot points to accommodate such movement. It will be understood that when the progressive mobility aid device 100 is releasably secured in the arrangement illustrated in FIG. 5B, the structural integrity of the frame of the progressive mobility aid device 100 is maintained such that the progressive mobility aid device 100 remains safe and stable and can generally support the weight and force applied by any potential user. Similarly, with regard to traversing up a set of stairs, the front leg assemblies (105 and 110) are raised to an elevation above the rear leg assemblies (115 and 120), as illustrated in FIG. 6B, to accommodate the vertical increment of the riser. When the progressive mobility aid device 100 is releasably secured in the arrangement illustrated in FIG. 6B, the user can rely on the structural integrity of the frame of the progressive mobility aid device 100 is ascend one step at a time until the user reaches the top of the set of stairs. The progressive mobility aid device 100 can then be returned to a configuration where the front leg assemblies (105 and 110) and rear leg assemblies (115 and 120) are at the same elevation, i.e., level (as illustrated in FIGS. 1, 3, and 4). As will be further understood, the arrangements illustrated in FIGS. 5B and 6B provide for the user to remain positioned between the rear leg assemblies (115 and 120) of the progressive mobility aid device 100, and generally in an upright position. Thus, from the user's perspective, the progressive mobility aid device 100, particularly the rear leg assemblies (115 and 120), is equivalently arranged whether the user is traversing a level surface or an inclining surface.

Similar to the prior description, when traverse a declining pathway, the front leg assemblies (105 and 110) are lowered to an elevation below the rear leg assemblies (115 and 120), as illustrated in FIG. 5A. When the front leg assemblies (105 and 110) are lowered to an elevation below the rear leg assemblies (115 and 120), as illustrated in FIG. 5A, the lower left sidebar 195 rotates in a counterclockwise direction (relative to FIG. 5A) about the first 245 and second 250 pivot points to accommodate such movement, the lower right sidebar 200 rotates in a counterclockwise direction about the third 255 and fourth 260 pivot points to accommodate such movement, the upper left sidebar 235 rotates in a counterclockwise direction about the fifth 265 and sixth 270 pivot points to accommodate such movement, and the upper right sidebar 240 rotates in a counterclockwise direction about the seventh 275 and eighth 280 pivot points to accommodate such movement. It will be understood that when the progressive mobility aid device 100 is releasably secured in the arrangement illustrated in FIG. 5A, the structural integrity of the frame of the progressive mobility aid device 100 is maintained such that the progressive mobility aid device 100 remains safe and stable and can generally support the weight and force applied by nearly any potential user. Similarly, with regard to traversing down a set of stairs, the front leg assemblies (105 and 110) are lowered to an elevation below the rear leg assemblies (115 and 120), as illustrated in FIG. 6A, to accommodate the vertical increment of the riser. When the progressive mobility aid device 100 is releasably secured in the arrangement illustrated in FIG. 6A, the user can rely on the structural integrity of the frame of the progressive mobility aid device 100 is descend one step at a time until the user reaches the bottom of the set of stairs. The progressive mobility aid device 100 can then be returned to a configuration where the front leg assemblies (105 and 110) and rear leg assemblies (115 and 120) are level (as illustrated in FIGS. 1, 2, and 4). As will be further understood, the arrangement illustrated in FIGS. 5A and 6A provides for the user to remain positioned between the rear leg assemblies (115 and 120) of the progressive mobility aid device 100 and generally in an upright position. Thus, from the user's perspective, the progressive mobility aid device 100, particularly the rear leg assemblies (115 and 120), is equivalently arranged whether the user is traversing a level surface or a declining surface.

As previously described, although the front leg assemblies (105 and 110) and rear leg assemblies (115 and 120) can be arranged at two different elevations, a top section of the frame (a pair of handles to be subsequently described) of the progressive mobility aid device 100 remains level and provides the user the stability required to safely traverse inclining and declining surfaces. As illustrated in the figures, the progressive mobility aid device 100 includes a left handle 285 and a right handle 290 that the user can manually engage to support himself or herself while using the progressive mobility aid device 100. In the examples illustrated in FIGS. 5A, 5B, 6A, and 6B, it is noted that the left 285 and right 290 handles remain level and provide the user with stable and secure points of engagement to maintain the user's balance and stability as the user traverses inclining and declining surfaces. It is further noted that the left 285 and right 290 handles extend away from the user. Such an arrangement encourages the user to properly position himself or herself between the rear leg assemblies (115 and 120) for consistent and safe use of the progressive mobility aid device 100.

As with the consistent positioning of the user relative to the rear leg assemblies (115 and 120), the consistency of the left 285 and right 290 handles of the progressive mobility aid device 100 remaining level, whether the user is traversing a level surface, an inclining surface, or a declining surface, provides the user with a constant user experience across all uses of the progressive mobility aid device 100. As will be understood, such consistency of arrangement and use creates an ambulatory assisting device that promotes safe use of the device and limits falls and other mishaps that can lead to injury.

As previously noted, the progressive mobility aid device 100 can be releasably secured or locked in the arrangements illustrated in FIGS. 4, 5A, 5B, 6A, and 6B. Further, the progressive mobility aid device 100 can be releasably secured or locked in many different arrangements to accommodate any number of inclining or declining surfaces situated at different angles or, for traversing various sets of stairs with different step riser heights. The progressive mobility aid device 100 includes a left clutch assembly 295 and a right clutch assembly 300 arranged to releasably secure the position of the front leg assemblies (105 and 110) relative to the rear leg assemblies (115 and 120). The left clutch assembly 295 is incorporated into the rear-left housing 225 and the right clutch assembly 300 is incorporated into the rear-right housing 230. Although the left 295 and right 300 clutch assemblies generally work in cooperation with one another, the left clutch assembly 295 specifically controls the position of the front-left leg assembly 105 relative to the rear-left leg assembly 115, and the right clutch assembly 300 specifically controls the position of the front-right leg assembly 110 relative to the rear-right leg assembly 120.

Figure 7:
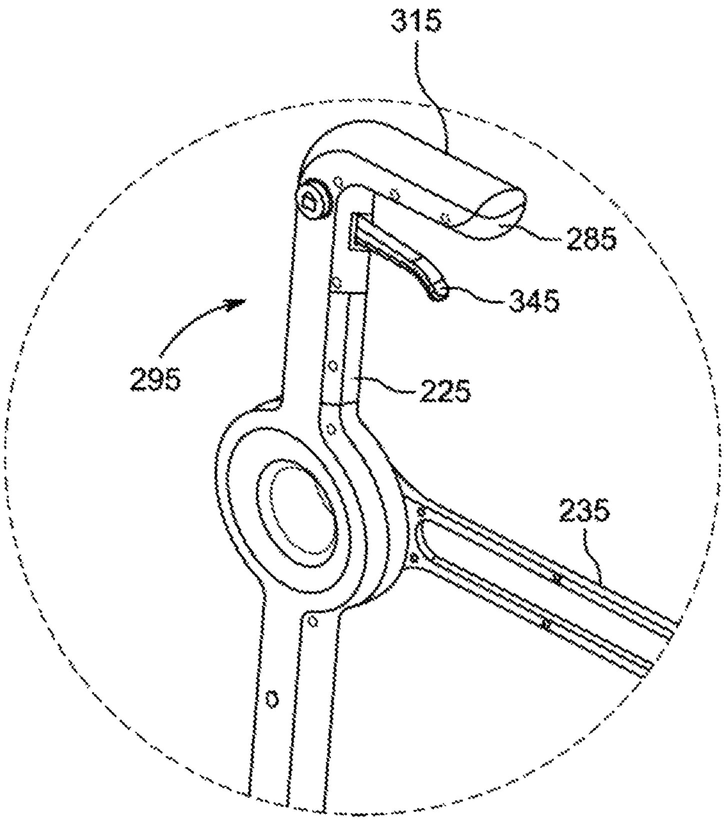
FIG. 7 schematically illustrates a perspective view of a left-side clutch assembly of the progressive mobility aid device of FIG. 1.
Figure 8:
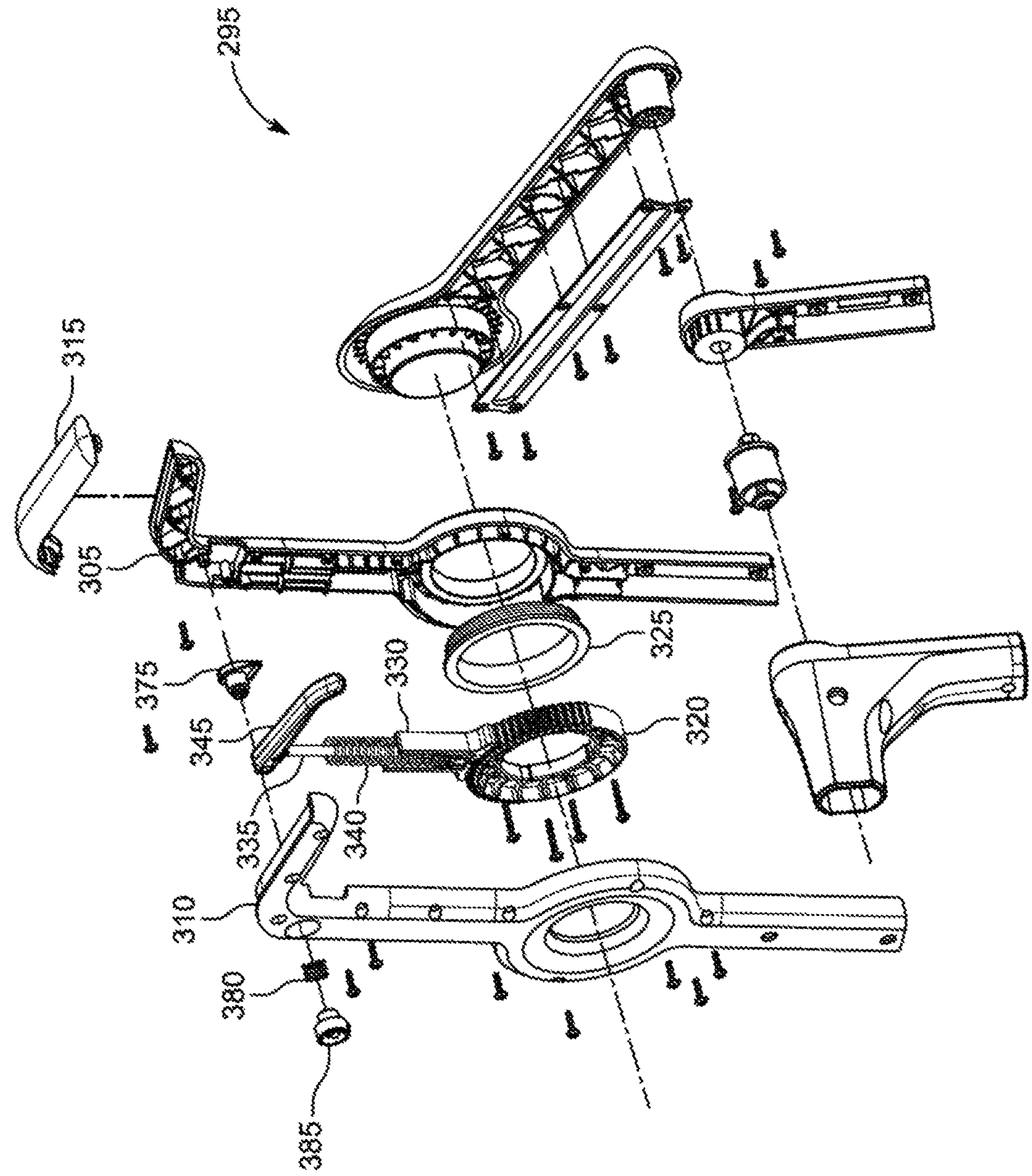
FIG. 8 schematically illustrates an exploded view of the left-side clutch assembly of FIG. 7.

FIG. 7 illustrates a perspective view of the left clutch assembly 295, and FIG. 8 illustrates an exploded view of the left clutch assembly 295. The description of the left clutch assembly 295 is equally applicable to the right clutch assembly 300. The rear-left housing 225 is comprising of two subcomponents, a first sub-housing 305 and a second sub-housing 310, that are secured together by multiple fasteners to form the rear-left housing 225. When assembled, the top portion of the rear-left housing 225 forms a left handle 285 that includes a handle cover 315 that provides for the user to manually engage the progressive mobility aid device 100. The rear-left housing 225 contains a number of components that are integral to securing the leg assemblies (105, 110, 115, and 120) in a desired arrangement. Such components include a clutch sprocket 320, a pivot bushing 325, a clutch block 330, a clutch rod 335, a clutch spring 340, and a clutch lever 345.

Figure 9:
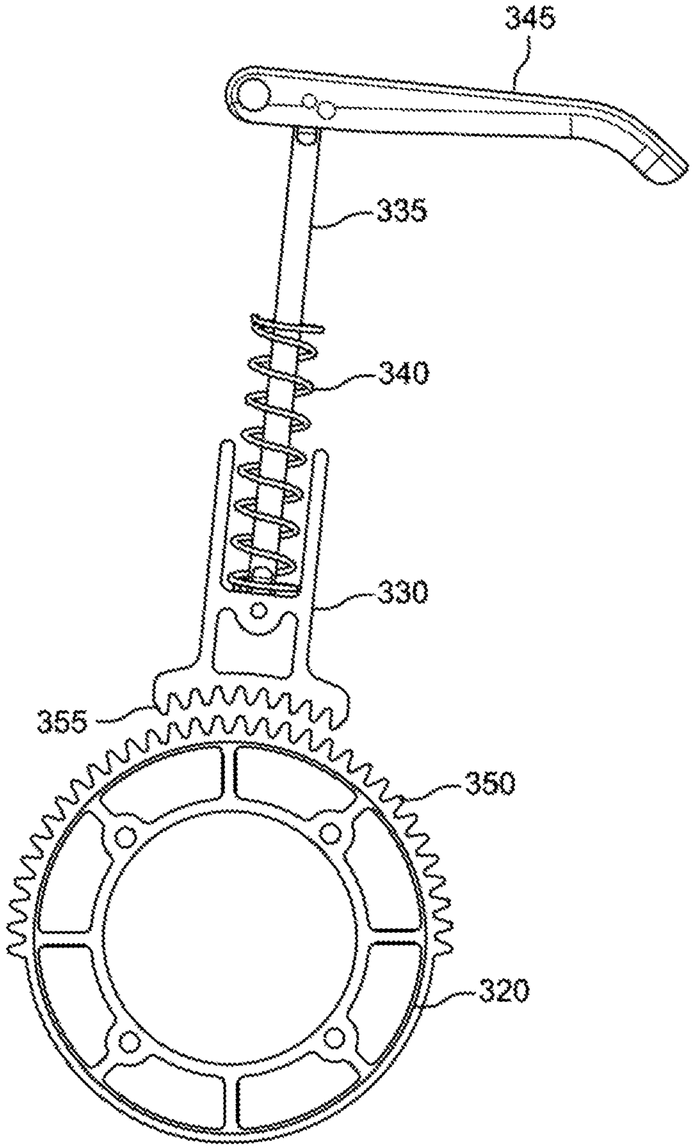
FIG. 9 schematically illustrates various components of the left-side clutch assembly of FIG. 7 in an unlocked configuration.
Figure 10:
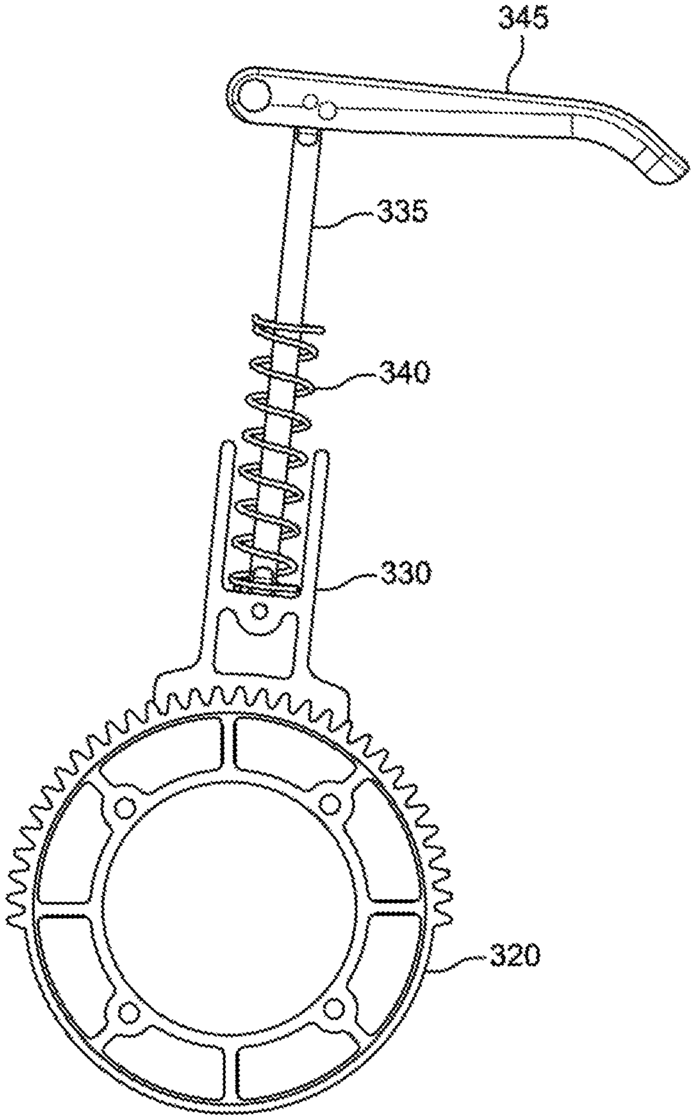
FIG. 10 schematically illustrates various components of the left-side clutch assembly of FIG. 7 in a locked configuration.

As illustrated in FIGS. 9 and 10 (which illustrate select components of the left clutch assembly 295), the clutch sprocket 320 includes a series of sprocket teeth 350 positioned along approximately half of the clutch sprocket 320 perimeter, and the clutch block 330 included a corresponding series of block teeth 355 along the clutch block's 330 bottom arcuate edge. As illustrated in FIG. 9, when the block teeth 355 are disengaged from the sprocket teeth 350, the clutch sprocket 320 is free to rotate relative to the clutch block 330, and, as illustrated in FIG. 10, when the block teeth 355 are engaged from the sprocket teeth 350, the clutch sprocket 320 is secured or locked in place relative to the clutch block 330. It will be appreciated that the number and placement of sprocket teeth 350 and block teeth 355 provide for a number of different orientations for the engagement of the sprocket teeth 350 and block teeth 355. For example, the clutch sprocket 320 can rotate approximately ninety degrees clockwise relative to the position illustrated in FIG. 9 and the sprocket teeth 350 can still engage the block teeth 355. Furthermore, the clutch sprocket 320 can rotate approximately ninety degrees counterclockwise relative to the position illustrated in FIG. 9 and the sprocket teeth 350 can still engage the block teeth 355. In the example illustrated herein, the clutch sprocket 320 includes approximately thirty-two teeth. Thus, the clutch sprocket 320 and clutch block 330 can be secured at approximately five to six degree increments across the clutch sprocket's approximately one hundred and eight degree rotational path. It will be understood that the example described and illustrated herein is merely one example of a clutch assembly. Clutch assemblies and the various components of clutch assemblies can be arranged in many different configurations to achieve different results. For example, the number and spacing of teeth on a clutch sprocket can be arranged to facilitate a greater or lesser rotational path, the number and spacing of teeth on a clutch sprocket can be arranged to create greater or lesser fixed increments along the rotational path the clutch sprocket, and the number of teeth on the clutch block 330 can be varied to achieve a more robust engagement between a clutch block and a clutch sprocket.

Figure 11:
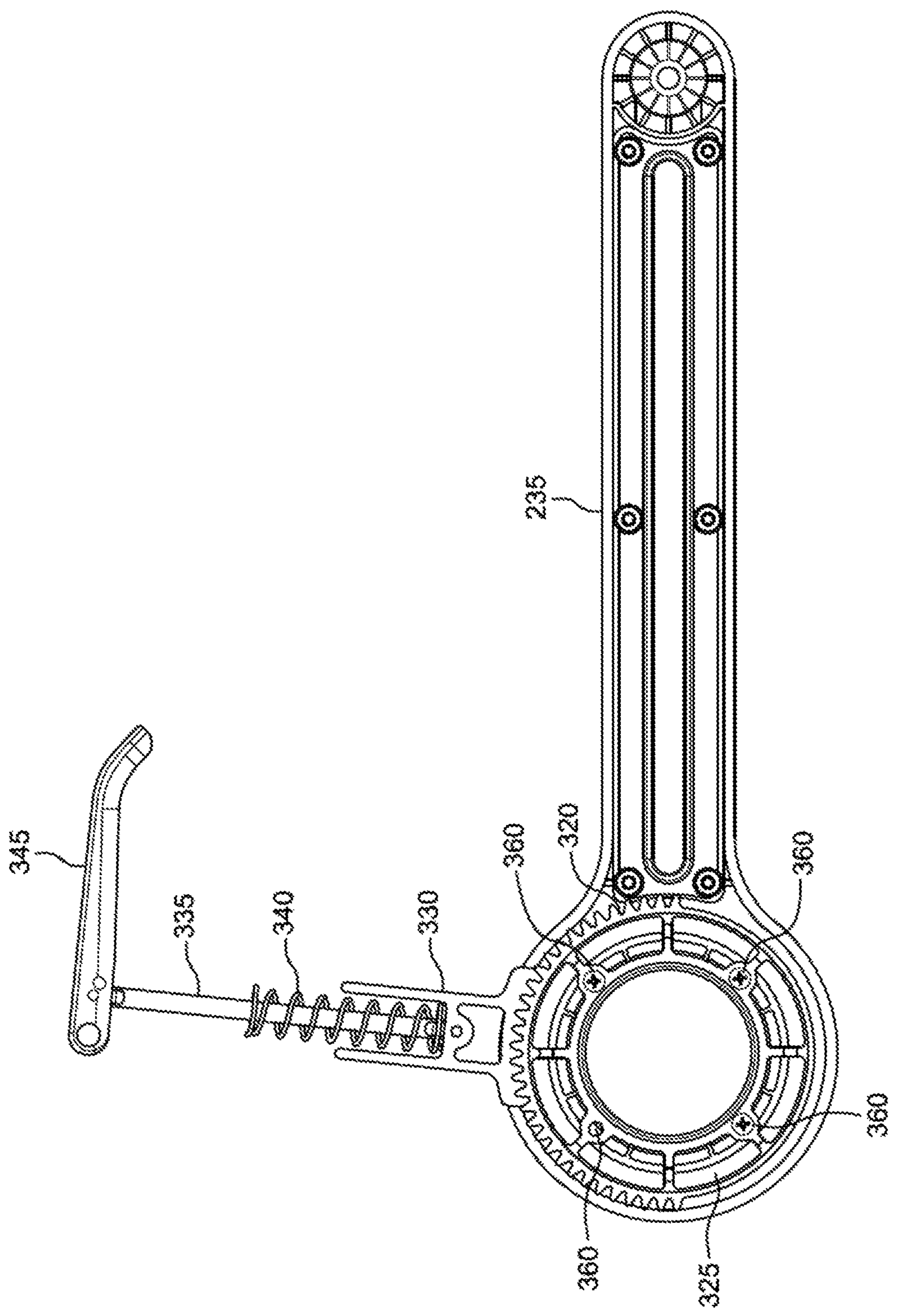
FIG. 11 schematically illustrates various components of the left-side clutch assembly of FIG. 7 in a locked configuration along with an upper left sidebar.
Figure 12:
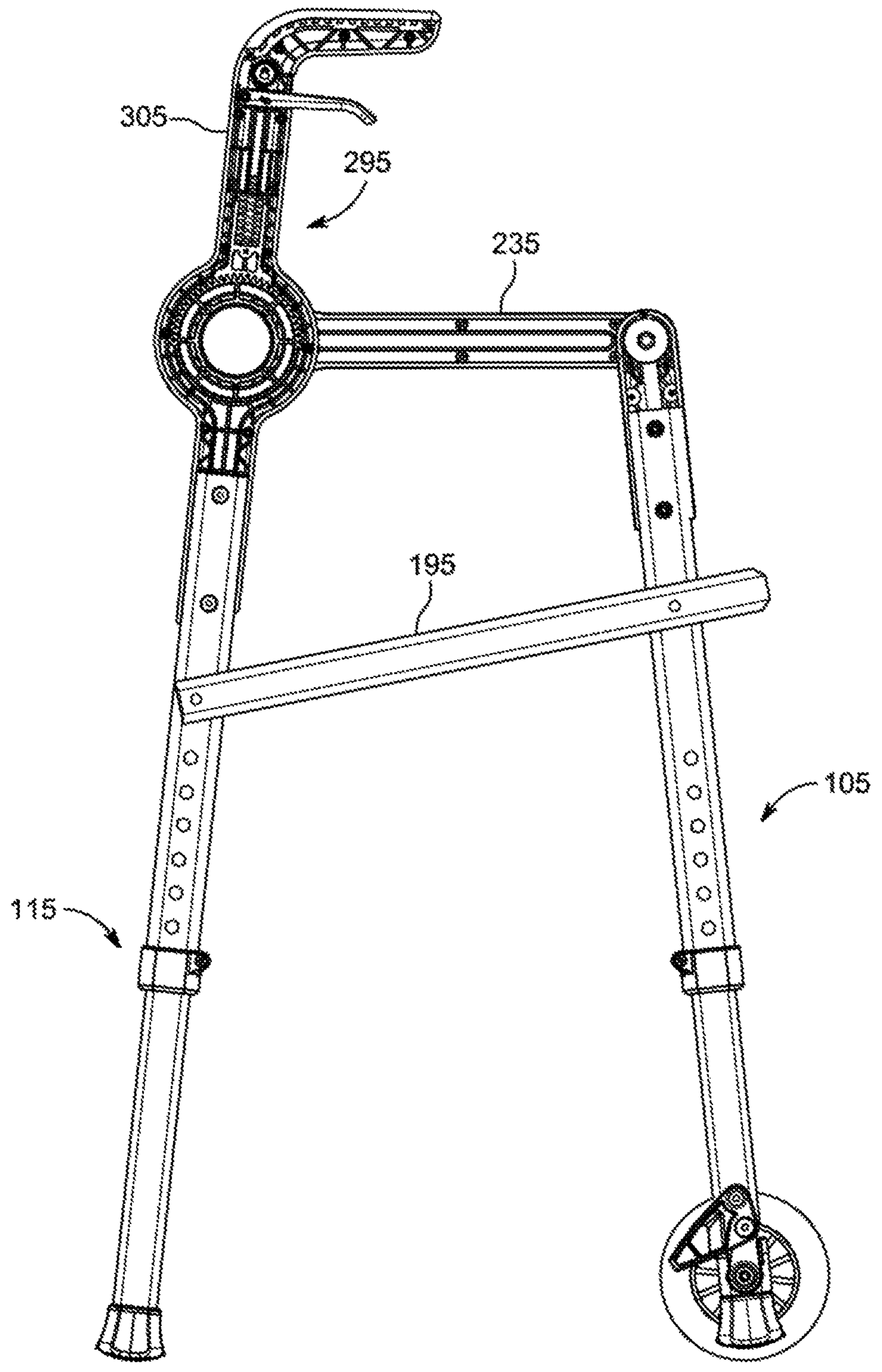
FIG. 12 schematically illustrates a partial progressive mobility aid device assembly of FIG. 1.

FIGS. 11 and 12 illustrate how such an arrangement affects the positioning of the front leg assemblies (105 and 110) relative to the rear leg assemblies (115 and 120). FIG. 11 illustrates the left clutch assembly 295 secured to the upper left sidebar 235. The clutch sprocket 320 and pivot bushing 325 are secured to the upper left sidebar 235 through a series of fasteners 360 so that rotational movement of the upper left sidebar 235 translates such rotational movement to the clutch sprocket 320 and vice versa. As illustrated in FIG. 12, the rear-left housing 225 (of which the first sub-housing 305 is illustrated) fixes the left clutch assembly 295 relative to the rear-left leg assembly 115 in all degrees of freedom except for the rotation of the clutch sprocket 320 about its central axis. When the clutch sprocket 320 rotates clockwise about its central axis, the end of the upper left sidebar 235 attached to the clutch sprocket 320 pivots about the clutch sprocket's 320 central axis and also rotates in a clockwise direction. Thus, the opposite end of the upper left sidebar 235 moves in a downward position. As previously described, the opposite end of the upper left sidebar 235 is pivotably connected to the front-left leg assembly 105; thus, the clockwise rotation of the clutch sprocket 320 results in the front-left leg assembly 105 moving downward such that the front-left leg assembly 105 is positioned at a lower elevation than the rear-left leg assembly 115. Such an arrangement is appropriate for using the progressive mobility aid device 100 for traversing a declining surface.

Conversely, when the clutch sprocket 320 rotates in a counterclockwise direction about its central axis, the upper left sidebar 235 also rotates in a counterclockwise direction, with the opposite end of the upper left sidebar 235 moving in an upward direction. Thus, the front-left leg assembly 105 moves upward such that the front-left leg assembly 105 is positioned at a higher elevation than the rear-left leg assembly 115. Such an arrangement is appropriate for using the progressive mobility aid device 100 for traversing an inclining surface. Because of the pivotal connection of the upper left sidebar 235 to the front-left leg assembly 105 and the pivotal connections of the lower left sidebar 195 to the front-left 105 and rear-left 115 leg assemblies, throughout the upward and downward movement of the front-left leg assembly 105, the rotational orientation of the front-left leg assembly 105 relative to the rear-left leg assembly 115 remains relatively constant.

With further reference to FIGS. 9 and 10, in order to actively position the front-left leg assembly 105 relative to the rear-left leg assembly 115, the clutch block 330 is disengaged from the clutch sprocket 320 (as illustrated in FIG. 9), which allows the clutch sprocket 320 and upper left sidebar 235 to freely rotate. The front-left leg assembly 105 can then be moved to user's desired elevation relative to the rear-left leg assembly 115. Once the front-left leg assembly 105 is positioned at the desired elevation relative to the rear-left leg assembly 115, the clutch block 330 is engaged with the clutch sprocket 320, and the clutch sprocket 320 and the upper left sidebar 235 are locked and secured in place. Thus, the front-left leg assembly 105 is locked and secured in place relative to the rear-left leg assembly 115. Once an analogous process is performed regarding positioning of the front-right leg assembly 110 relative to the rear-right leg assembly 120, the progressive mobility aid device 100 is configured to assist the user in traversing an uneven surface. It will be understood that in practice, the step of positioning of the front-left leg assembly 105 relative to the rear-left leg assembly 115 and the step of positioning of the front-right leg assembly 110 relative to the rear-right leg assembly 120 are generally performed at the same time and in coordination with one another. Additionally, it will be understood that to lower the elevation of the front leg assemblies (105 and 110) the user can rely on the force of gravity to lower the front leg assemblies once the clutch sprockets are disengaged by the clutch blocks. Conversely, to raise the front leg assemblies (105 and 110), the user can disengage the clutch sprockets and clutch blocks, place the front leg assemblies (105 and 110) on a surface and apply a force to raise the front leg assemblies (105 and 110) relative to the rear leg assemblies (115 and 120).

Figure 13:
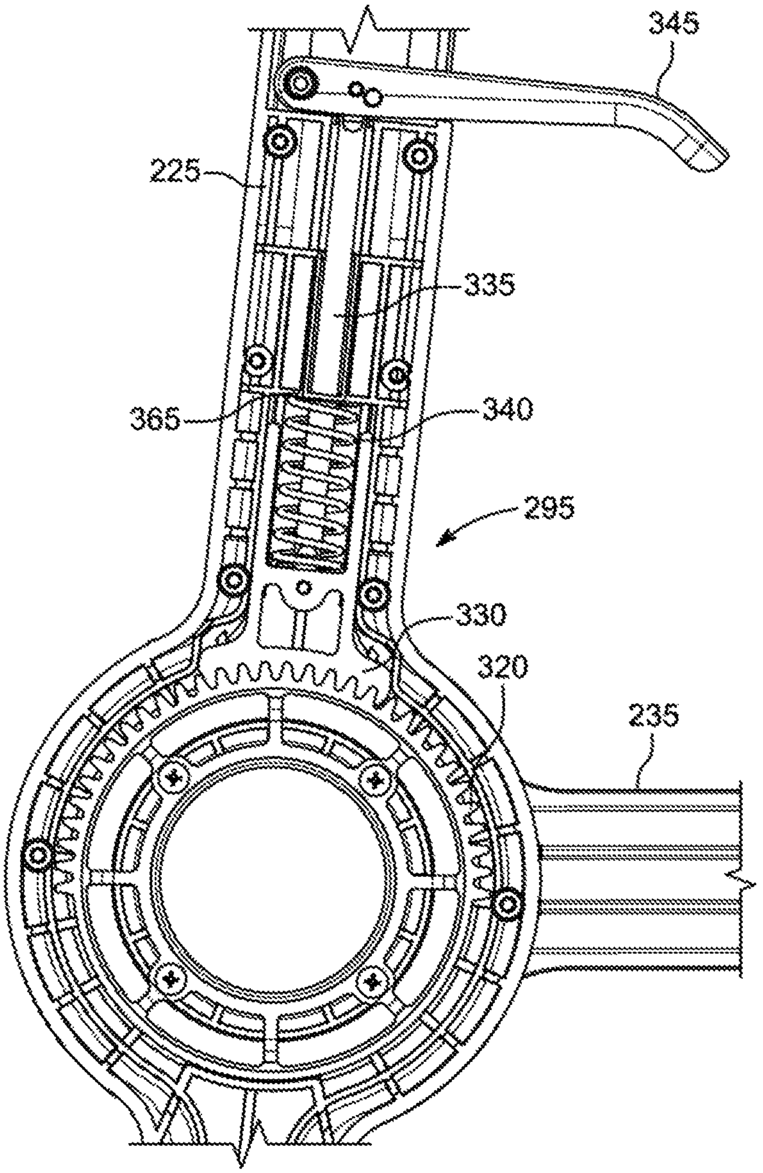
FIG. 13 schematically illustrates various components of the left-side clutch assembly of FIG. 7 in a locked configuration.
Figure 14:
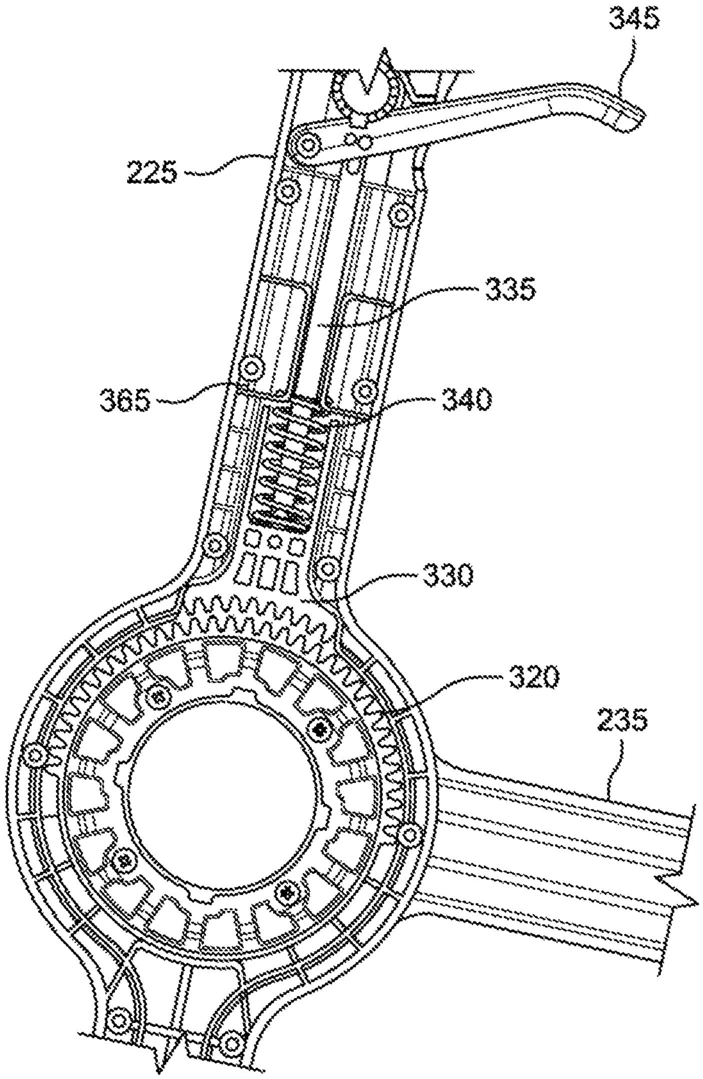
FIG. 14 schematically illustrates various components of the left-side clutch assembly of FIG. 7 in an unlocked configuration.

The default position of the clutch assemblies (295 and 300) is for the clutch block 330 to be engaged with the clutch sprocket 320, which secures the position of the front leg assemblies (105 and 110) relative to the rear assemblies (115 and 120). The clutch assemblies (295 and 300) are arranged such that the user has to take specific action(s) to manually manipulate the clutch assemblies (295 and 300) to disengage the clutch block 330 and clutch sprocket 320 (and analogous components of the right clutch assembly) in order to position the front-leg assemblies (105 and 110). With reference to FIGS. 13 and 14, the clutch spring 340 is positioned within an open ended shaft in the clutch block 330. One end of the clutch spring 340 is engaged with an inner surface of the clutch block 330, and the other end of the clutch spring 340 is engaged with a stop 365 integral to the rear-left housing 225. The clutch spring 340 operates as a compression spring, that is to say that when the clutch spring 340 is assembled within the clutch block 330 and within the rear-left housing 225, the clutch spring 340 is compressed such that it always asserts a positive force on the clutch block 330 that biases the clutch block 330 downward and into engagement with the clutch sprocket 320 (as illustrated in FIG. 13).

As illustrated throughout the figures, a clutch rod 335 is attached to the clutch block 330 on a first end and pivotably attached to the clutch lever 345 on the other end. In order to disengage the clutch block 330 from the clutch sprocket 320, the user manually manipulates the clutch lever 345. As illustrated in FIG. 14, when the clutch lever 345 is pulled in the upward direction, the force asserted by the clutch lever 345 overcomes the force of the clutch spring 340, and the clutch block 330 moves upward and away from the clutch sprocket 320. Thus, disengaging the clutch block 330 from the clutch sprocket 320, which facilitates movement of the front-left leg assembly 105 allowing the user to position the front-left leg assembly in his or her desired position. Once the front-left leg assembly 105 is in its desired position, the clutch lever 345 is released, the clutch spring's 340 force moves the clutch block 330 into engagement with the clutch sprocket 320, and secures and locks the front-leg assembly 105 in that desired position.

Figure 15A:
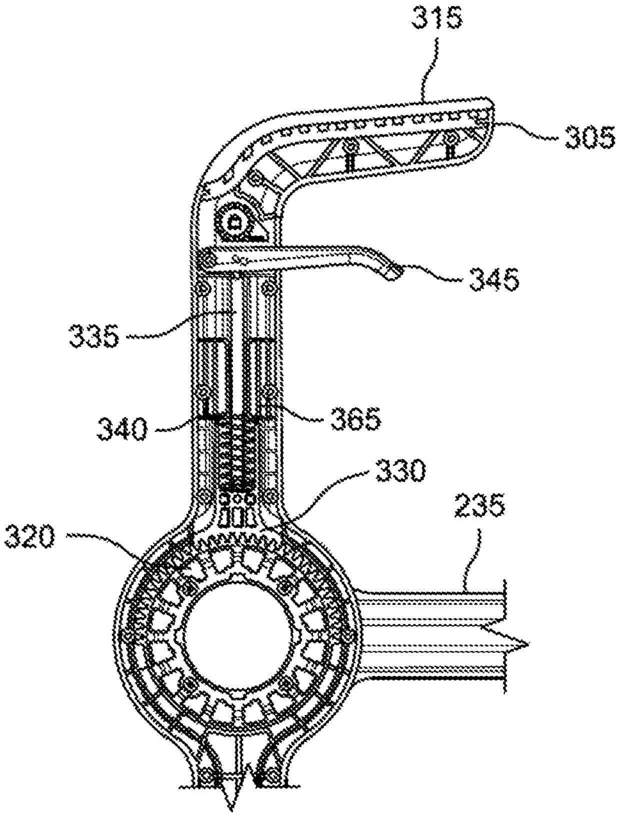
FIG. 15A-D schematically illustrates the locking and unlocking of left-side clutch assembly of FIG. 7.
Figure 15B:
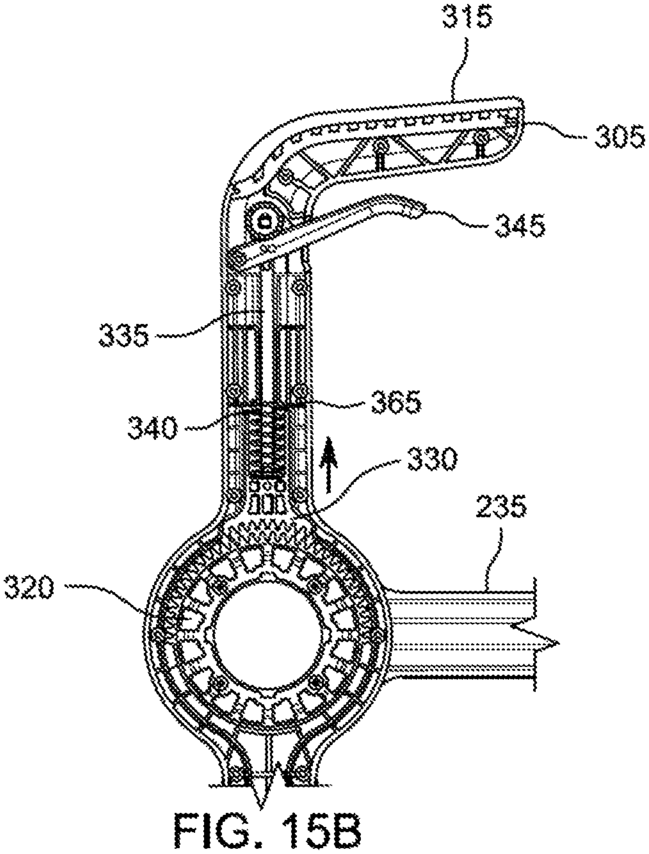
Figure 15C:
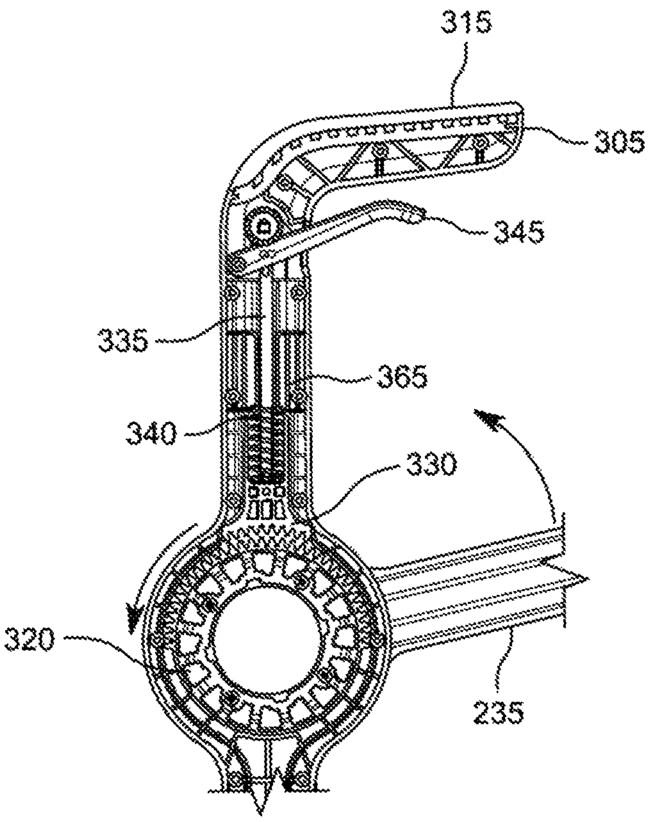
Figure 15D:
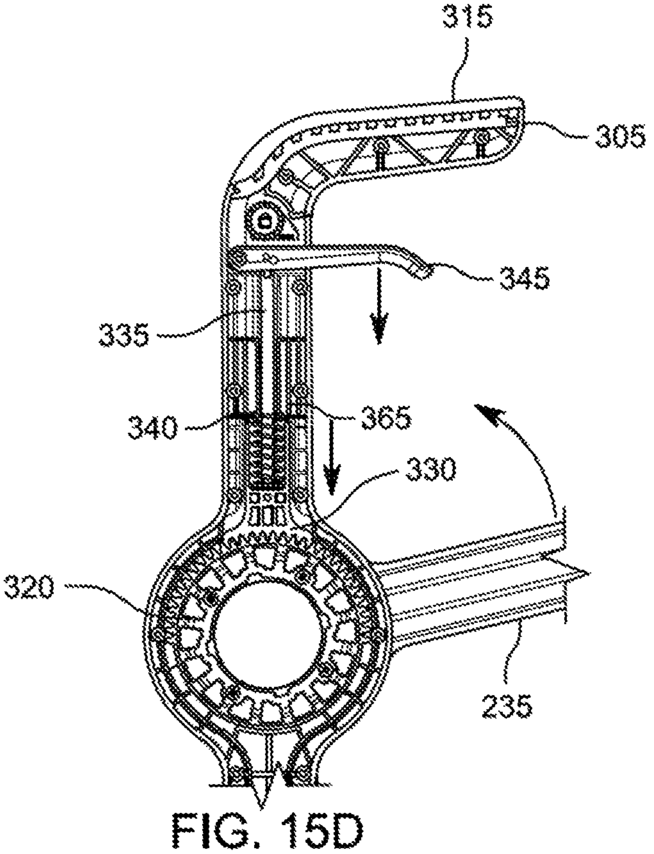

FIGS. 15A-D illustrate the steps of the described method for adjusting the position of the front-left leg assembly 105. FIG. 15A illustrates the progressive mobility aid device 100 in its "base" position, which is to say that the progressive mobility aid device 100 is arranged to assist the user in traversing level or even surfaces. In FIG. 15B, the clutch lever 345 is manually actuated upward to move and disengage the clutch block 330 from the clutch sprocket 320. In FIG. 15C, the upper left sidebar 235 and clutch sprocket 320 are rotated counterclockwise to raise the elevation of the front-left leg assembly 105. Finally, in FIG. 15D, the clutch lever 345 is released, the clutch block 330 reengages with the clutch sprocket 320, and the position of the clutch sprocket 320, upper left sidebar 235, and, more importantly, the front-left leg assembly 105 is secured and locked into place.

Figure 16:
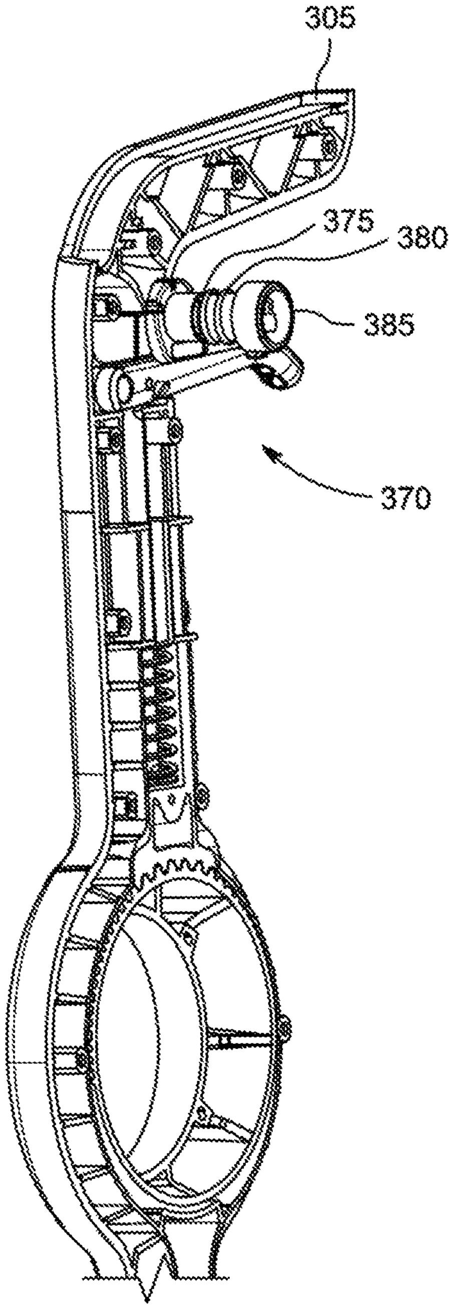
FIG. 16 schematically illustrates a cam locking assembly for use with the progressive mobility aid device of FIG. 1.
Figure 17:
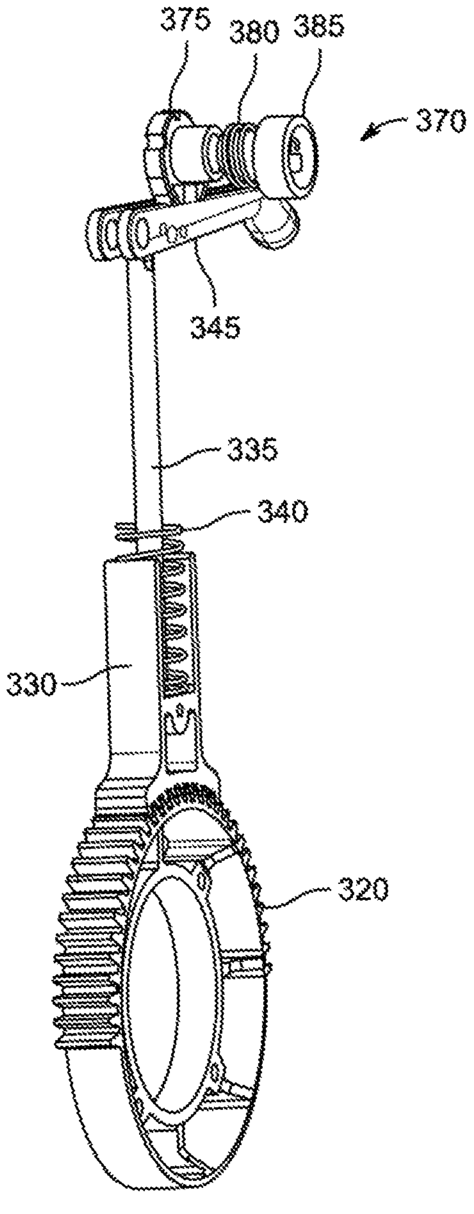
FIG. 17 schematically illustrates the cam locking assembly of FIG. 16 in a locked configuration.
Figure 18:
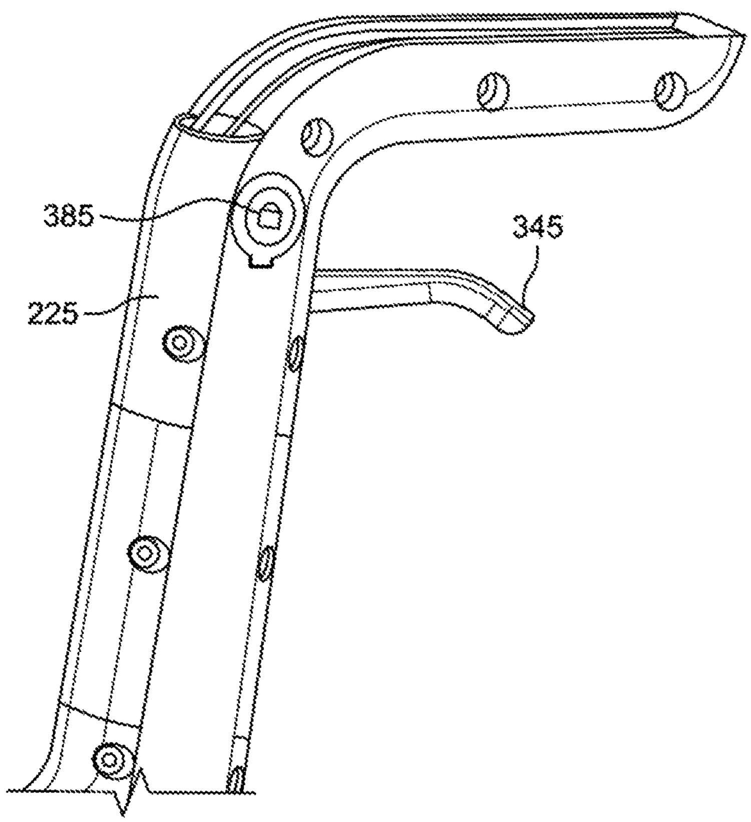
FIG. 18 schematically illustrates the cam locking assembly of FIG. 16 in an unlocked configuration.
Figure 19:
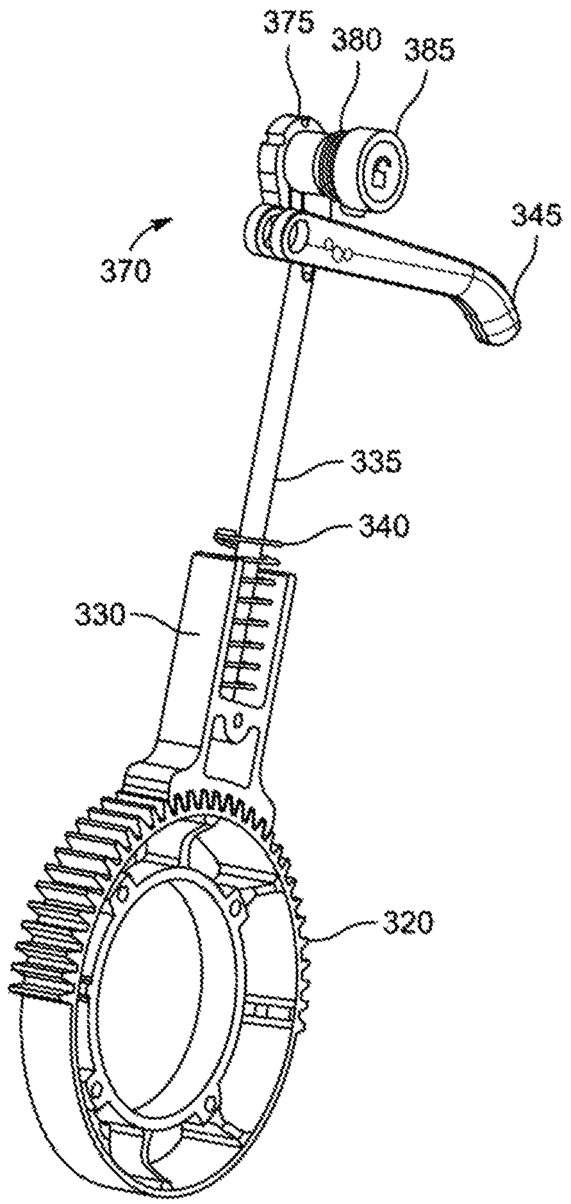
FIG. 19 schematically illustrates the cam locking assembly of FIG. 16 in an unlocked configuration.
Figure 20A:
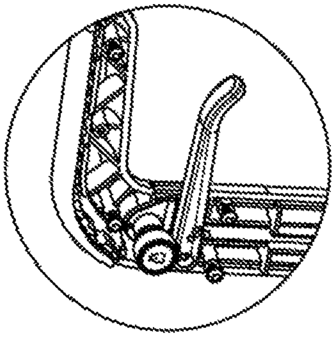
FIG. 20A-J schematically illustrates the locking and unlocking of cam locking assembly of FIG. 16.
Figure 20B:
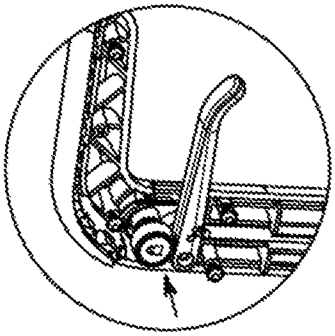
Figure 20C:
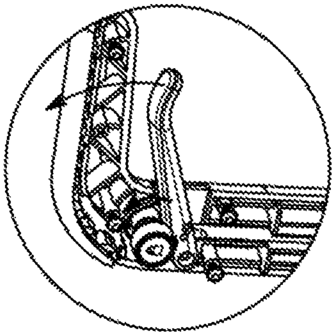
Figure 20D:
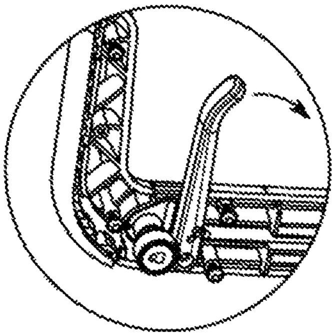
Figure 20E:
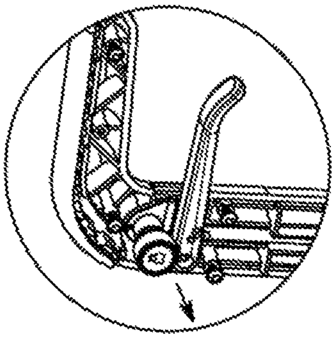
Figure 20F:
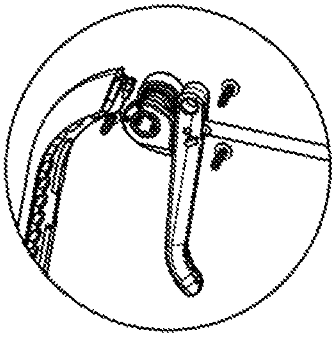
Figure 20G:
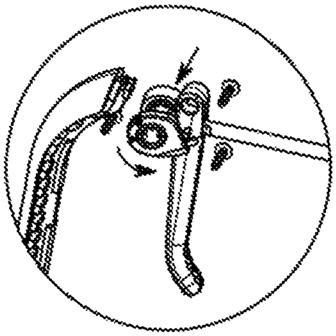

The progressive mobility aid device 100 includes a safety feature that guards against a user inadvertently actuating the clutch lever 345. Such a safety feature protects against the user inadvertently unlocking the front leg assemblies (105 and 110) to freely move when the progressive mobility aid device 100 is being used to traverse uneven surfaces. This safety feature is a cam locking assembly 370, illustrated in FIGS. 8 and 16-20. The cam locking assembly 370 is positioned in the rear-left housing 225 proximate to the clutch lever 345 and includes cam 375, a cam spring 380, and lock button 385. FIGS. 16 and 17 illustrate the cam locking assembly 370 in its default arrangement, with the cam 375 positioned above and in contact with the clutch lever 345. In such a position, the cam 375 blocks upward movement of clutch lever 345. Without such upward movement of the clutch lever 345, the left clutch mechanism 295 maintains engagement of the clutch block 330 and clutch sprocket 320 and the front leg assemblies (105 and 110) remain secured and locked into place. In order to change this default arrangement, the user must manually manipulate the cam 375 to allow upward movement of the clutch lever 345. The cam spring 380 and lock button 385 are positioned in contact with the cam 375. The cam spring 380 biases the lock button 385 outward (relative to the rear-left housing 225) and biases the cam 375 in a clockwise direction (with reference to FIG. 17). Thus, when the user depresses the lock button 385 inward relative to the rear-left housing 225, as illustrated in FIG. 18, the cam 375 is pushed past the clutch lever 345 and the cam 375 rotates downward, as illustrated in FIG. 19. In such a position, the clutch lever 345 is now free to move upwardly when actuated by the user. FIG. 20 illustrates this process using five pairs of figures. FIGS. 20A-20E are from the same general perspective of FIGS. 16-19 with the second sub-housing 310 of the rear-left housing 225 removed, and FIGS. 20F-20J are from the opposite perspective with both the first 305 and second 310 sub-housings of the rear-left housing 225 removed. As illustrated in FIGS. 20A and 20F, the cam locking assembly 370 is positioned in its default position, which blocks upward movement of the clutch lever 345. As illustrated in FIGS. 20B and 20G, the lock button 385 is depressed, which moves the cam 375 past the clutch lever 345, the cam spring

Figure 20H:
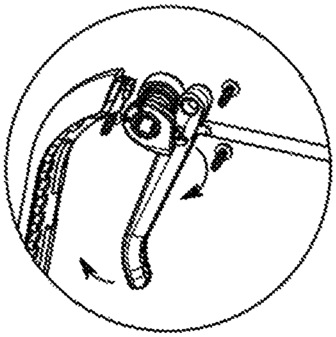
Figure 20I:
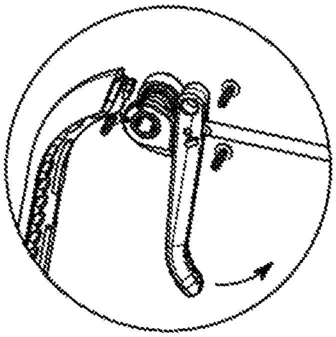
Figure 20J:
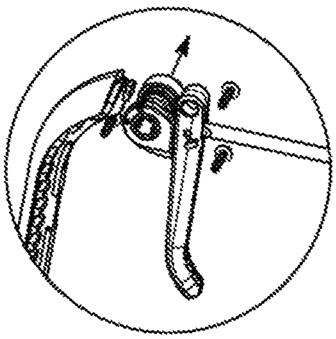
Figure 21:
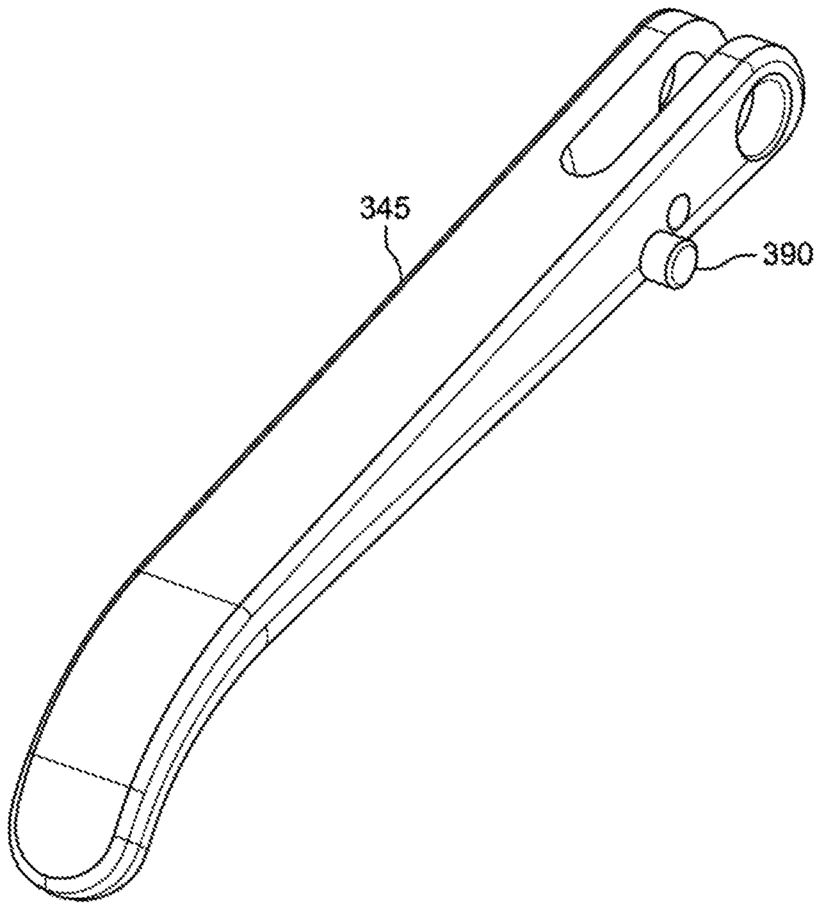
FIG. 21 schematically illustrates a clutch lever.

380 biases the cam 375 to rotate clockwise (with reference to FIG. 20B) thus, freeing the clutch lever 345 to move upward when the user actuates the clutch lever 345. As illustrated in FIGS. 20C and 20H, when the clutch lever 345 is actuated and moves in an upward direction, in addition to the clutch sprocket 320 being freed to rotate, a hook 390 extending from the clutch lever 345 (as best illustrated in FIG. 21) engages the cam 375 and rotates the cam 375 in a counterclockwise direction (again with reference to FIG. 20B) as the clutch lever 345 is moved upwardly. As illustrated in FIGS. 20D and 20I, when the user releases the clutch lever 345, the cam 375 and lock button again move outward so that the cam 375 again rests on top of the clutch lever 345 and blocks upward movement of the clutch lever 345 (as illustrated in FIGS. 20E and 20J). Thus, the progressive mobility aid device 100 is arranged for the user to effectively place the leg assemblies (105, 110, 115, and 120) in a desired configuration by actuating the clutch levers, and once the leg assemblies (105, 110, 115, and 120) are in that desired configuration, the user must proactively take specific additional actions to unlock the leg assemblies (105, 110, 115, and 120) to change the configuration.

Figure 22:
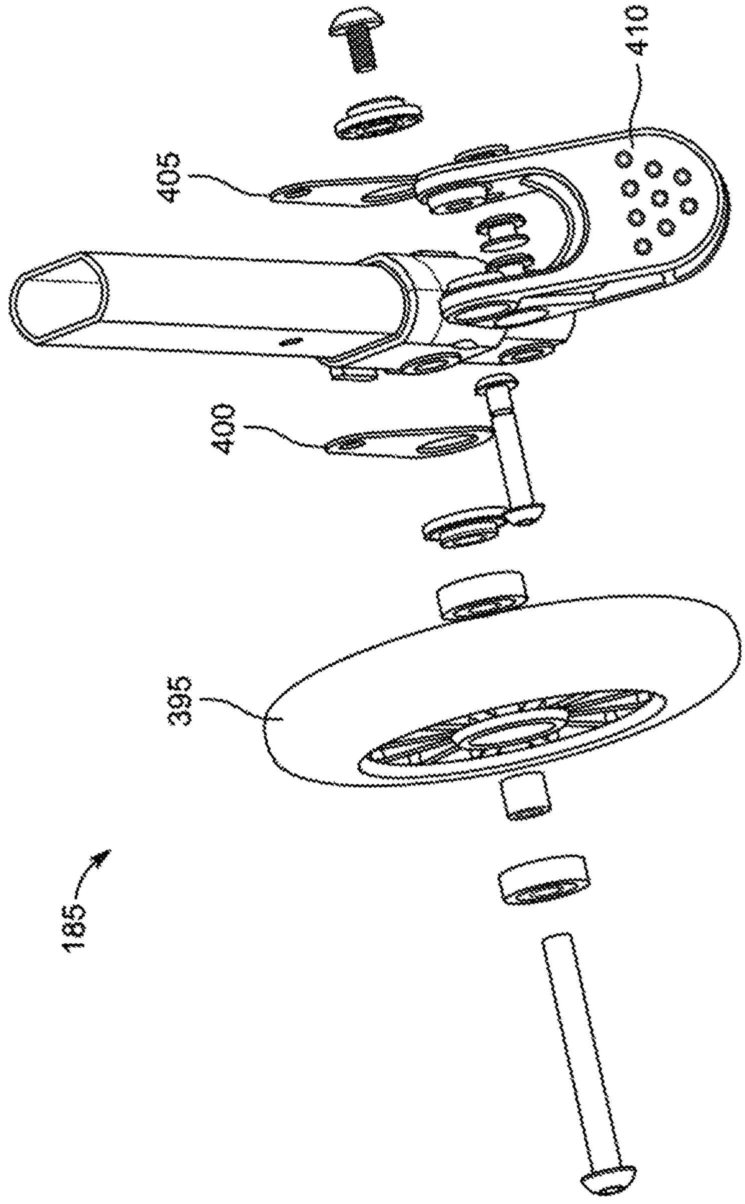
FIG. 22 schematically illustrates an exploded view of a wheel assembly for use with the progressive mobility aid device of FIG. 1.
Figure 23:
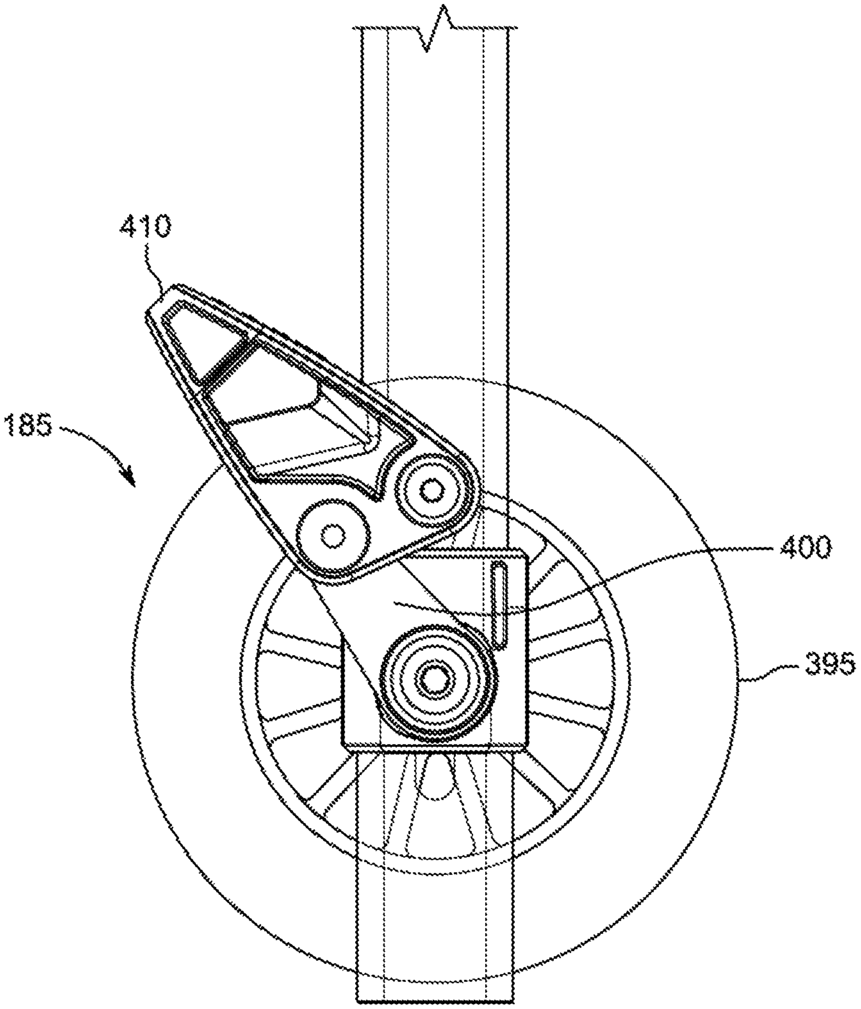
FIG. 23 schematically illustrates the wheel assembly of FIG. 22 in a retracted position.
Figure 24:
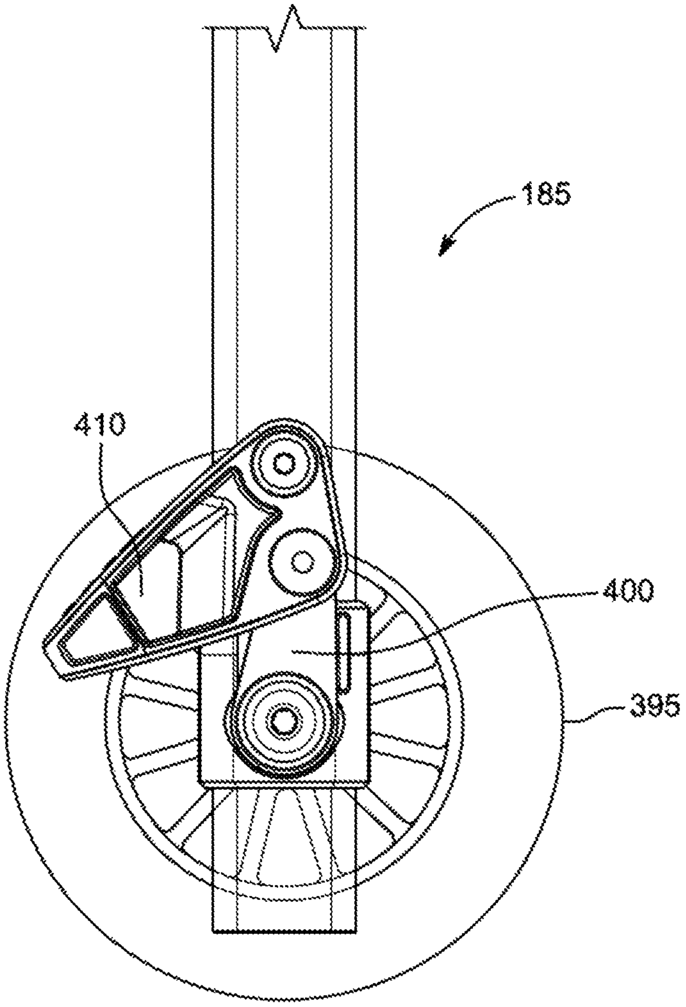
FIG. 24 schematically illustrates the wheel assembly of FIG. 22 in a deployed position.

As previously described and illustrated in FIGS. 1-6, the progressive mobility aid device 100 includes a pair of wheel assemblies (185 and 190). As illustrated in FIG. 22, each wheel assembly includes a wheel 395, a pair of wheel linkages (400 and 405), a wheel pedal 410, and various other components for attaching the wheel assembly to a front lower tubular member (125 and 130) of a front leg assembly (105 and 110) and facilitating rotation of the wheel 395. The wheel 395 can be positioned either in a retracted position, as illustrated in FIG. 23, where the wheel 395 is not used when the progressive mobility aid device 100 is aiding a user to traverse a surface, or in an deployed position, as illustrated in FIG. 24, where the wheel 395 is positioned to engage a surface when the progressive mobility aid device 100 is aiding a user to traverse that surface. The user can manually (typically using his or her foot) move the wheel assembly between its retracted position and deployed position using the wheel pedal 410. As illustrated in FIG. 23, when the wheel pedal 410 is moved upward, the wheel 395 is retracted via the wheel linkages (400 and 405). As illustrated in FIG. 24, when the wheel pedal 410 is moved downward, the wheel 395 is deployed via the wheel linkages (400 and 405).

Figure 25:
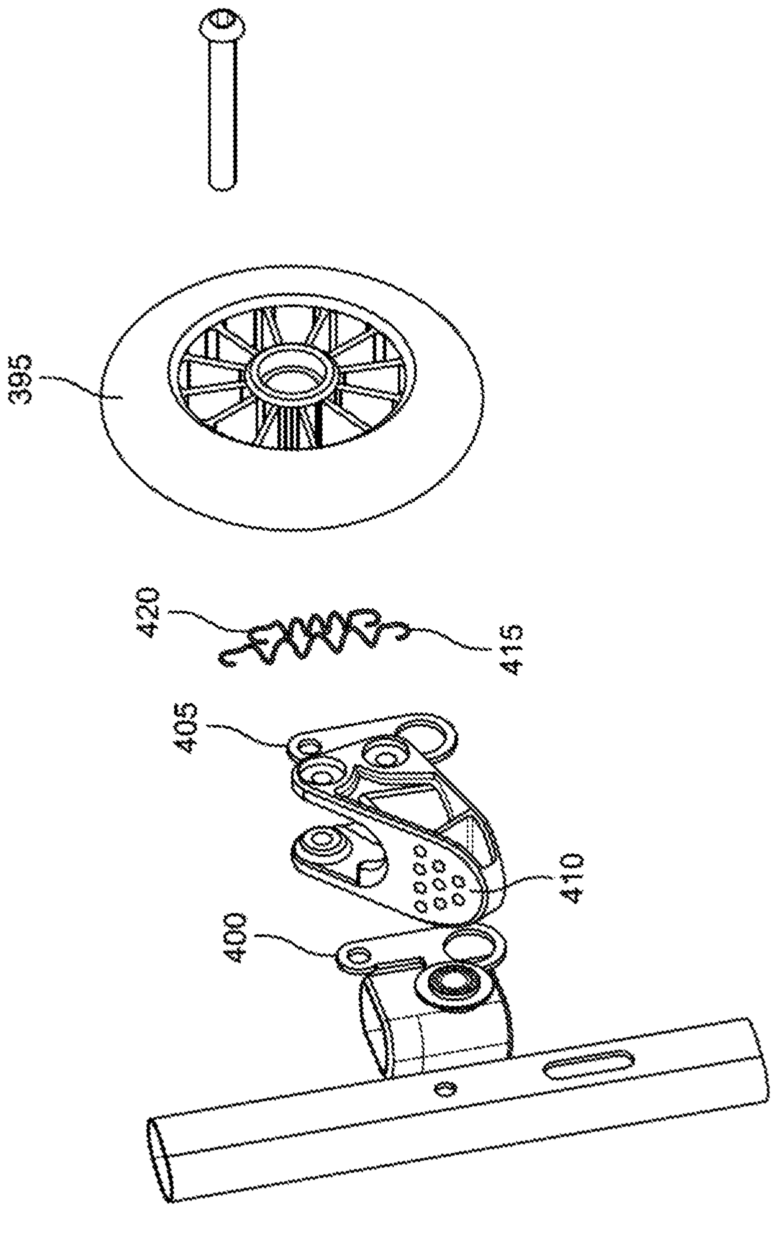
FIG. 25 schematically illustrates another exploded view of a wheel assembly for use with the progressive mobility aid device of FIG. 1.
Figure 26:
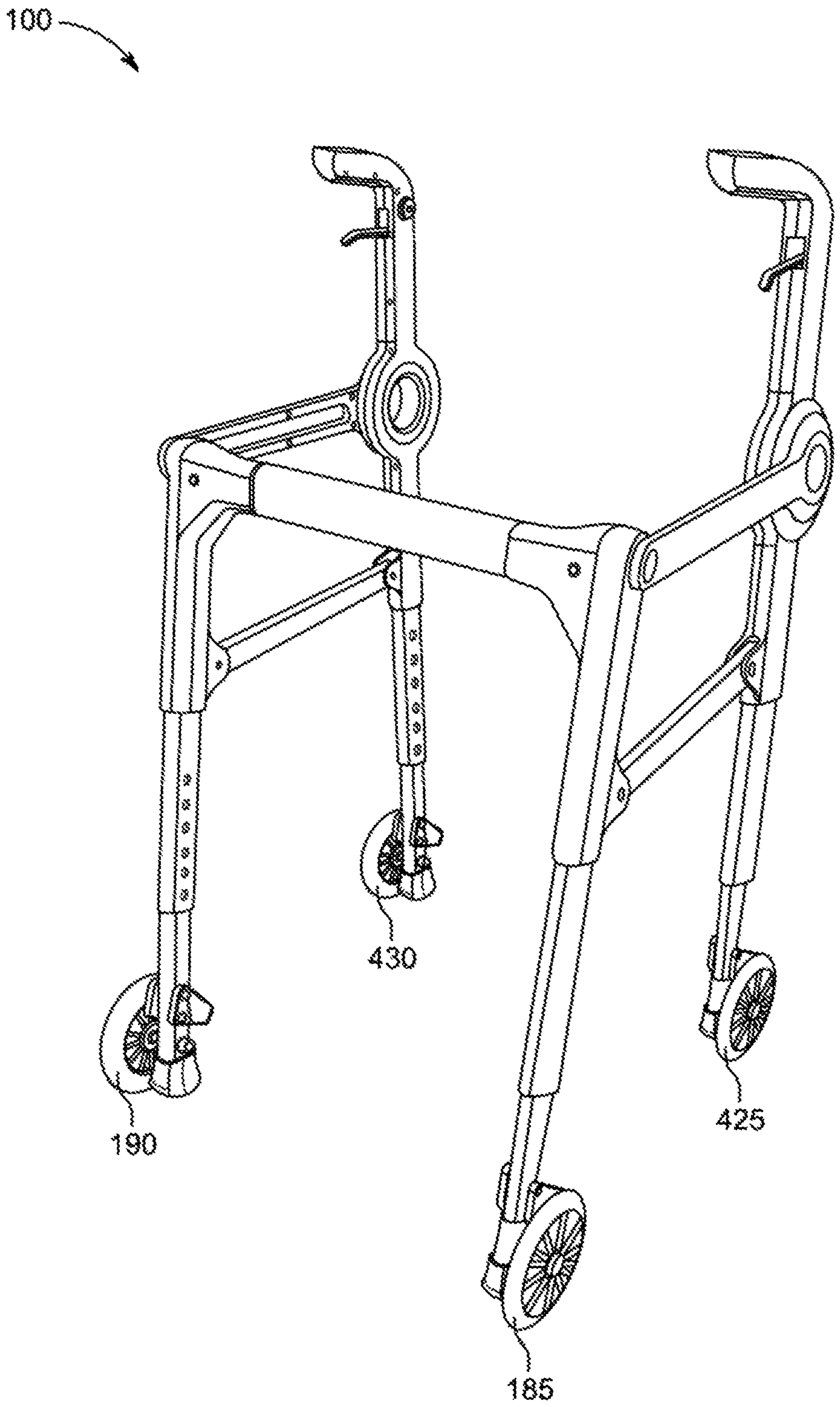
FIG. 26 schematically illustrates the progressive mobility aid device of FIG. 1 with four wheel assemblies.

As illustrated in FIG. 25, the movement of the wheel assemblies (185 and 190) can be facilitated by the inclusion of biasing members (415 and 420), such as springs. For example, a pair of spring (415 and 420) can be incorporated that biases the wheel 395 to the retracted position. In such an arrangement, the user would depress the wheel pedal 410, overcome the force of the springs (415 and 420), and lock the wheel 395 in the deployed position. When the user no longer needs the wheel 395 deployed, the user can tap or depress the wheel pedal 410 and the springs (415 and 420) will return the wheel 395 to the retracted position. While the example described and illustrated herein discloses two wheel assemblies (185 and 190) secured to the front leg assemblies (105 and 110) of the progressive mobility aid device 100, the progressive mobility aid device 100 can include four wheel assemblies (185, 190, 425, and 430), as illustrated in FIG. 26, one secured to each of the leg assemblies (105, 110, 1015, and 120) of the progressive mobility aid device 100.

With regard to wheel assemblies, the embodiments disclosed herein provide for a user to quickly and efficiently deploy and retract wheels. Therefore, the user can quickly adjust the progressive mobility aid device 100 from a device with no deployed wheels, to a device with two deployed wheels, and to a device with four deployed wheels.

Additional features can be incorporated into the progressive mobility aid device. In one example, a toilet seat can be included to accommodate the user using a public restroom or private bathroom. In one embodiment, a toilet seat can be pivotally or rotationably hinged to the lower crossbar (or optionally to the upper crossbar). When not in use, the toilet seat is flipped upward and rests against the upper crossbar. In one embodiment, the toilet seat can be secured to the upper crossbar when not in use. When the user needs to use the restroom, the progressive mobility aid device can be maneuvered over a toilet, the toilet seat of the progressive mobility aid device can be lowered such that it is located above the toilet, the user can sit on the toilet seat of the progressive mobility aid device, and the user can use the restroom. When done using the restroom, the user can return the toilet seat to its stowed position. In such an embodiment, when the progressive mobility aid device is positioned above the toilet, the front wheel assemblies can be located toward the back of the toilet, and the rear wheel assemblies can be located near the front of the toilet. The lower crossbar and lower right and left sidebars can be arranged to clear the top of the toilet so that the progressive mobility aid device can be properly maneuvered into place. It will be understood that those users that have a need for a progressive mobility aid device may also have difficulty lowering themselves and raising themselves for low rise toilets. The incorporated toilet seat described herein can alleviate the need for a user to physically use low rise toilets. In one embodiment, the progressive mobility aid device can include a storage pouch secured to the upper and/or lower crossbars. The toilet seat can be stowed in the pouch when not in use to, in effect, hiding the toilet seat from view when not in use.

In another embodiment, a storage pouch can be secure to the upper or lower crossbars or the upper or lower sidebars. Such a pouch can be used to stow the users personal effects while using the progressive mobility aid device. In yet another embodiment, a holder can be secured to the upper or lower crossbars or the upper or lower sidebars (or any other section of the to the upper or lower crossbars or the upper or lower sidebars). Such a holder can be arranged to hold a mobile device (e.g., cell phone or smart phone), a beverage container (such as a cup), a cane, or any other object that the user desires to travel with. With regard to the mobile device, it will be appreciated that holding the mobile device in a location accessible to the user can be beneficial to the user by provided a hands-free method of communication to the user or providing the user with access to navigation applications as the user moves from one location to another.

The foregoing description of examples has been presented for purposes of illustration and description. It is not intended to be exhaustive or limiting to the forms described. Numerous modifications are possible in light of the above teachings. Some of those modifications have been discussed, and others will be understood by those skilled in the art. The examples were chosen and described in order to best illustrate principles of various examples as are suited to particular uses contemplated. The scope is, of course, not limited to the examples set forth herein, but can be employed in any number of applications and equivalent devices by those of ordinary skill in the art.

We claim:

1. A progressive mobility aid device comprising:

a front-left leg assembly including an upper end and a lower end;

a front-right leg assembly including an upper end and a lower end;

a rear-left leg assembly, including:

a rear-left housing, wherein a portion of the rear-left housing forms a left handle, and the rear-left housing includes a first mechanical stop;

a left clutch assembly positioned within the rear-left housing, the left clutch assembly comprising:

a left clutch sprocket that includes a set of left clutch sprocket teeth;

a left clutch block that includes a set of left clutch block teeth;

a left clutch rod;

a left clutch spring; and a left clutch lever;

a right-right leg assembly including:

a rear-right housing, wherein a portion of the rear-right assembly forming a right handle, and the rear-right housing includes a second mechanical stop;

a right clutch assembly positioned within the rear-right housing the right clutch assembly comprising:

a right clutch sprocket that includes a set of right clutch sprocket teeth;

a right clutch block that includes a set of right clutch block teeth;

a right clutch rod;

a right clutch spring; and a right clutch lever;

a lower left sidebar including a first end an second end, where the lower left sidebar is pivotably coupled to the front-left leg assembly proximate to the first end and pivotably coupled to the rear-left leg assembly proximate to the second end;

a lower right sidebar including a first end and a second end, where the lower right sidebar is pivotably coupled to the front-right leg assembly proximate to the first end and pivotably coupled to the rear-right leg assembly proximate to the second end;

an upper left sidebar including a first end and a second end, where the upper left sidebar is pivotably coupled to the front-left leg assembly proximate to the first end and pivotably coupled to the rear-left leg assembly proximate to the second end;

an upper right sidebar including a first end and a second end, where the upper right sidebar is pivotably coupled to the front-right leg assembly proximate to the first end and pivotably coupled to the rear-right leg assembly proximate to the second end;

a front-left wheel assembly coupled proximate to the lower end of the front-left leg assembly, the front-left wheel assembly comprising:

a front-left wheel;

a first front-left wheel linkage with a firt end and a second end, with the first end coupled to the front-left wheel;

a second front-left wheel linkage with a first end and a second end, with the first end coupled to the front-left wheel; and a front-left pedal coupled to the second end of the first front-left wheel linkage and coupled to the second end of the second front-left wheel linkage; and a front-right wheel assembly coupled proximate to the lower end of the front-right leg assembly, the front-right wheel assembly comprising:

a front-right wheel;

a first front-right wheel linkage with a first end and a second end, with the first end coupled to the front-right wheel;

a second front-right wheel liknage with a first end and a second end, with the first end coupled to the front-right wheel; and a front-right pedal coupled to the second end of the first front-fright wheel linkage and coupled to the second end of the second front-right wheel linkage;

wherein the front-left pedal is arranged to move the front-left wheel between a deployed position where the front-left wheel extends past the lower end of the front-left leg and a retracted position where the lower end of the front-left leg extends past the front-left wheel; and wherein the front-right pedal is arranged to move the front-right wheel between a deployed position where the front-right wheel extends past the lower end of the front-right leg and a retracted position where the lower end of the front-right leg extends past the front-left wheel.

2. The progressive mobility aid device of claim 1, further comprising:

a lower crossbar coupled to the lower left sidebar and coupled to the lower right sidebar; and an upper crossbar coupled to the upper left sidebar and coupled to the upper right sidebar.

3. The progressive mobility aid device of claim 1, wherein:

the left clutch rod is coupled to the left clutch sprocket at a first end and the left clutch lever at a second end;

the left clutch spring is positioned about the left clutch rod and in contact on a first end with the left clutch block and in contact on a second end with the first mechanical stop;

the right clutch rod is coupled to the right clutch sprocket at a first end and the right clutch lever at a second end; and the right clutch spring is positioned about the right clutch rod and in contact on a first end with the right clutch block and in contact on a second end with the second mechanical stop.

4. The progressive mobility aid device of claim 3, wherein:

the left clutch spring biases the left clutch block toward the left clutch sprocket; and the right clutch spring biases the right clutch block toward the right clutch sprocket.

5. The progressive mobility aid device of claim 4, wherein:

the left clutch lever is arranged to have an unactuated position and an actuated position; and the right clutch lever is arranged to have an unactuated position and an actuated position.

6. The progressive mobility aid device of claim 5, wherein:

when the left clutch lever is in the unactuated position, the left clutch block is in contact with the left clutch sprocket;

when the left clutch lever is in the actuated position, the left clutch block is spaced apart from the left clutch sprocket;

when the right clutch lever is in the unactuated position, the right clutch block is in contact with the right clutch sprocket; and when the right clutch lever is in the actuated position, the right clutch block is spaced apart from the right clutch sprocket.

7. The progressive mobility aid device of claim 6, wherein:

when the left clutch block is in contact with the left clutch sprocket, the left clutch block teeth are engaged with the left clutch sprocket teeth; and when the right clutch block is in contact with the right clutch sprocket, the right clutch block teeth are engaged with the right clutch sprocket teeth.

8. The progressive mobility aid device of claim 7, wherein:

when the left clutch block is in contact with the left clutch sprocket, the relative position of the left clutch block is fixed with respect to the left clutch sprocket; and when the right clutch block is in contact with the right clutch sprocket, the relative position of the right clutch block is fixed with respect to the right clutch sprocket.

9. The progressive mobility aid device of claim 8, wherein:

the left clutch sprocket is fixedly coupled to the left upper side bar; and the right clutch sprocket is fixedly coupled to the right upper side bar.

10. The progressive mobility aid device of claim 9, wherein:

when the left clutch lever is in the unactuated position, the front-left leg assembly is fixed relative to the rear-left leg assembly; and when the right clutch lever is in the unactuated position, the front-right leg assembly is fixed relative to the rear-right leg assembly.

11. The progressive mobility aid device of claim 9, wherein:

when the left clutch lever is in the actuated position, the front-left leg assembly is free to move relative to the rear-left leg assembly; and when the right clutch lever is in the actuated position, the front-right leg assembly is free to move relative to the rear-right leg assembly.

12. The progressive mobility aid device of claim 1, wherein the rear-left leg assembly includes an upper end and a lower end and the rear-right leg assembly includes an upper end and a lower end; the progressive mobility aid device further comprising:

a read-left wheel assembly coupled proximate to the lower end of the rear-left leg assembly, the read-left wheel assembly comprising:

a rear-left wheel;

a first rear-left wheel linkage with a first end and a second end, with the first end coupled to the read-left wheel;

a second read-left wheel linkage with a first end and a second end, with the first end coupled to the rear-left wheel; and a read-left pedal coupled to the second end of the first rear-left wheel linkage and coupled to the second end of the second rear-left wheel linkage; and a rear-right wheel assembly coupled proximate to the lower end of the rear-right leg assembly, the rear-right wheel assembly comprising:

a rear-right wheel;

a first rear-right wheel linkage with a first end and a second end, with the first end coupled to the reear-right wheel;

a second rear-right wheel linkage with a first end and a second end, with the first end coupled to the rear-right wheel; and a rear-right pedal coupled to the second end of the first rear-right wheel linkage and coupled to the second end of the second rear-right wheel linkage;

wherein the rear-left pedal is arranged to move the rear-left wheel between a deployed position where the rear-left wheel extends past the lower end of the rear-left leg and a retracted position where the lower end of the rear-left leg extends past the rear-left wheel; and wherein the rear-right pedal is arranged to move the rear-right wheel between a deployed position where the rear-right wheel extends past the lower end of the rear-right leg and a retracted position where the lower end of the rear-right leg extends past the rear-left wheel.

13. The progressive mobility aid device of claim 12, wherein:

the rear-left wheel assembly further comprises a biasing member that biases the rear-left wheel toward the retracted position; and the rear-right wheel assembly further comprises a biasing member that biases the rear-right wheel toward the retracted position.

14. The progressive mobility aid device of claim 1, wherein:

the front-left wheel assembly furtheer comprises a biasing member that biases the front-left wheel toward the retracted position; and the front-right wheel assembly further comprises a biasing member that biases the front-right wheel toward the retracted position.

* * * * *